US012270708B2

(12) United States Patent
Meggers et al.

(10) Patent No.: US 12,270,708 B2
(45) Date of Patent: Apr. 8, 2025

(54) SCANNING MOTION AVERAGE RADIANT TEMPERATURE SENSOR APPLICATIONS

(71) Applicant: The Trustees of Princeton University, Princeton, NJ (US)

(72) Inventors: Forrest Meggers, Princeton, NJ (US); Nicholas Houchois, Princeton, NJ (US); Eric Teitelbaum, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 968 days.

(21) Appl. No.: 17/059,567

(22) PCT Filed: May 30, 2019

(86) PCT No.: PCT/US2019/034605
§ 371 (c)(1),
(2) Date: Nov. 30, 2020

(87) PCT Pub. No.: WO2019/232181
PCT Pub. Date: Dec. 5, 2019

(65) Prior Publication Data
US 2021/0208002 A1 Jul. 8, 2021

Related U.S. Application Data

(60) Provisional application No. 62/677,734, filed on May 30, 2018.

(51) Int. Cl.
*G01J 5/00* (2022.01)
*G01J 5/02* (2022.01)
(Continued)

(52) U.S. Cl.
CPC ............... *G01J 5/026* (2013.01); *G01J 5/047* (2013.01); *G01J 5/07* (2022.01); *G01J 5/0846* (2013.01);
(Continued)

(58) Field of Classification Search
CPC .......... G01J 5/0025; G01J 5/026; G01J 5/047; G01J 5/07; G01J 5/0808; G01J 5/0846; G01J 5/10; G01J 5/48; G01K 3/06
See application file for complete search history.

(56) References Cited

U.S. PATENT DOCUMENTS 4,747,699 A * 5/1988 Kobayashi .............. G01W 1/17
374/9
9,442,075 B2 9/2016 Rueb
(Continued)

FOREIGN PATENT DOCUMENTS

| CN | 103250037 A | 8/2013 |
|---|---|---|
| CN | 106679098 A | 5/2017 |

(Continued)

OTHER PUBLICATIONS

International Search Report and Written Opinion for PCT/US2019/034605, dated Aug. 23, 2019.
(Continued)

*Primary Examiner* — Mohamed Charioui
*Assistant Examiner* — Christine Y Liao
(74) *Attorney, Agent, or Firm* — MEAGHER EMANUEL LAKS GOLDBERG & LIAO, LLP

(57) ABSTRACT

Disclosed herein are a spherical-motion average radiant temperature sensor (SMART Sensor) system which can be used in various applications, including but not limited to, informing or controlling HVAC systems in buildings, locating and tracking people or objects, and detecting the release of gases. The system may optionally include the use of sensors other than a non-contacting temperature sensor to improve calculations and determinations made by the system.

15 Claims, 15 Drawing Sheets

(51) Int. Cl.
*G01J 5/04* (2006.01)
*G01J 5/07* (2022.01)
*G01J 5/08* (2022.01)
*G01J 5/10* (2006.01)
*G01K 3/06* (2006.01)
*G01J 5/48* (2022.01)

(52) U.S. Cl.
CPC ............... *G01J 5/10* (2013.01); *G01K 3/06* (2013.01); *G01J 5/48* (2013.01)

(56) References Cited

U.S. PATENT DOCUMENTS

| | | | |
|---|---|---|---|
| 9,506,809 B2 | 11/2016 | Shin | |
| 10,495,518 B2* | 12/2019 | Kusukame | G01J 5/07 |
| 2006/0077354 A1* | 4/2006 | Goik | H04N 9/3129 353/57 |
| 2012/0038778 A1 | 2/2012 | Klager et al. | |
| 2012/0265350 A1 | 10/2012 | Ashdown | |
| 2013/0230074 A1 | 9/2013 | Shin | |
| 2014/0253719 A1 | 9/2014 | Rueb | |
| 2015/0094914 A1* | 4/2015 | Abreu | B60H 1/00742 701/1 |
| 2017/0192406 A1 | 7/2017 | Ashdown et al. | |
| 2018/0073930 A1 | 3/2018 | Meggers et al. | |

FOREIGN PATENT DOCUMENTS

| | | |
|---|---|---|
| CN | 104034258 A | 11/2018 |
| WO | 2016154282 A1 | 3/2016 |

OTHER PUBLICATIONS

English Translation of Notification of Second Office Action and Supplemental Search Report for corresponding Chinese Application No. 201980038701.5, dated Apr. 3, 2024.

Office Action from corresponding Chinese application No. 201980038701.5, dated Oct. 19, 2023.

* cited by examiner

SCANNING MOTION AVERAGE RADIANT TEMPERATURE SENSOR APPLICATIONS

CROSS-REFERENCE TO RELATED APPLICATIONS

This application claims priority to U.S. Provisional Application No. 62/677,734, filed May 30, 2018, which is herein incorporated by reference in its entirety.

TECHNICAL FIELD

This relates generally to scanning motion average radiant temperature sensors, and more particularly, to methods of using such sensors in a variety of applications.

BACKGROUND OF THE INVENTION

In today's world, architects must design structures that take the comfort of those inside the structure into account. As all bodies exchange thermal radiation with their surroundings, architects and engineers often consider the Mean Radiant Temperature ("MRT") of a location, and how it relates to the comfort experienced by a person. The most accurate system to date requires a very costly and time-consuming process involving multiple radiometers taking readings across a spectrum of wavelengths at a given location. As has been a standard practice for decades, however, those in building sciences typically measure MRT using a black-globe thermometer. A black-globe thermometer consists of a black globe with a temperature sensor probe placed in the center.

Traditional MRT devices are typically dedicated to determining MRT and are not readily adapted to other purposes. Rather, additional sensors are placed in order to provide additional functionality to a given space. For example, in an office workspace in which a traditional MRT may be occasionally utilized, there may also be one or more smoke detectors, light detectors, motions sensors, humidity sensors, and other sensors as desired in the space.

There has been a long-felt need for a single, simple cost-effective device, system, or method that can quickly and accurately measure the MRT, and provide information regarding multiple locations, that is not impacted by convection effects. Such a device, system, and method were proposed in PCT/US16/23735.

These devices can potentially be utilized in new ways in a wide range of fields.

BRIEF SUMMARY

A first disclosed aspect is a mean radiant temperature sensor device system. The system includes a two or more degree-of-freedom motion system (including a three or more degree-of-freedom motion system), a non-contacting temperature sensor operably connected to the two or more degree-of-freedom motion system, data storage, and a processor, where the processor is configured to receive data from the sensor and can calculate mean radiant temperature (MRT) as well perform at least one other function selected from the following: occupancy detection, counting objects or individuals, locating objects or individuals in a volume of space, tracking an object or individual over time and space, detection of unsafe environmental conditions, characterization of unsafe environmental conditions, tracking of unsafe environmental conditions, detection of gases, detection of liquids, characterization of gases, characterization of liquids, tracking of gases, tracking of liquids, analysis of buildings, determination of control metrics for a building or volume of space, generation of 3D and 2D models or representations of spaces and buildings using data from the sensor, generating 2D images of surfaces, generating 2D images of scenes, generating 2D images of environments, generating 3D point clouds of surfaces, generating 3D point clouds of scenes, generating 3D point clouds of environments, controlling actuators, controlling HVAC systems with data other than mean radiant temperature (MRT), informing HVAC systems with data other than MRT, controlling building systems other than HVAC, estimating a metabolic rate using surface temperature information from the sensor, estimating the thermal capacitance of living organisms, receiving input from occupants, requesting input from occupants based on data from the sensor, controlling the environmental conditions based on a combination of input from occupants and data from the sensor, calibrating energy models for heat loss and insulation levels in building simulation and analysis, commissioning building systems to ensure appropriate comfort via measurement of MRT, and quantifying and confirming energy savings and operational performance of buildings. The processor may be configured to (i) calculate a mean radiant temperature (MRT) using a view factor and radiative heat exchange calculation, (ii) determine the effects of the radiative environment on a real or hypothetical person, animal or object, (iii) use meshing of point clouds to model and find surfaces and objects, or (iv) a combination thereof. The processor may be (i) configured to calculate occlusion based on data from the sensor, (ii) configured to determine thermal comfort, (iii) configured to receive data from a source other than the non-contacting, temperature sensor, (iv) adapted to integrate building information models (BIM) with the data from the sensor, (v) configured to perform a calculation prior to the completion of a scan, (vi) configured to adjust or weight a reading or factor to account for at least one variable selected from the group consisting of clothing, emissivity of surfaces, and transmissivity of objects, or (vii) a combination thereof. The processor may be configured to communicate with a visual camera, an air quality sensor, a gas detection sensor, a radiation sensor utilizing at least one wavelength different from the non-contacting temperature sensor, a time of flight camera, and/or a structured light sensor. The system may be configured (i) for use in a non-building application, (ii) to oversample points, or (iii) to use any distribution of points, or (iv) a combination thereof. The non-contacting temperature sensor may be (i) configured to use a variable scan pattern, (ii) configured to perform an action based on the received data from the source other than the non-contacting, temperature sensor, (iii) configured to collect data continuously during continuous movement of the two or more degree-of-freedom motion system, (iv) capable of functioning as a structured light sensor, or (v) a combination thereof. The non-contacting temperature sensor may be a plurality of non-contacting temperature sensors, such as an array of sensors, and may be configured to move relative to a fixed geographic position. The system may also include a lens, a beam splitter, a galvanometer configured to control movement of the axes, and/or a filter selected to alter the sensitivity of sensors to a plurality of wavelength of light. The field of view of the sensor may be adjustable. The sensor may be mounted on a drone, vehicle, or robotic arm.

DETAILED DESCRIPTION

The present disclosure is drawn to Scanning Motion Average Radiant Temperature (SMART) Sensor system utilized in various applications.

Figure 1A:
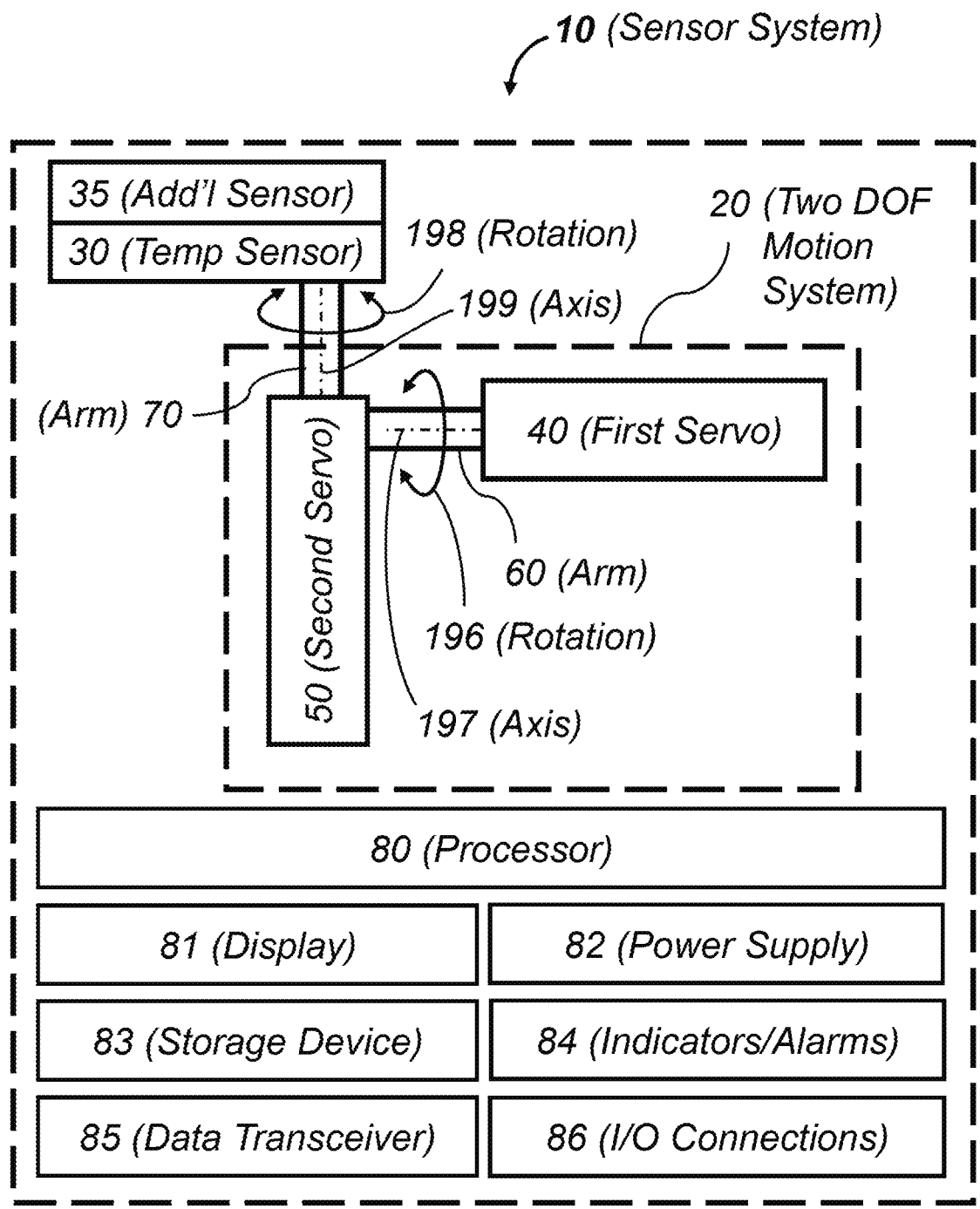
FIGS. 1A, 1B, and 1C depict disclosed sensor systems.

Referring to FIG. 1A, generally, a sensor system (10) includes a two (or more) degree of freedom motion system (20), a non-contacting temperature sensor (30) operably connected to the two (or more) degree of freedom motion system (20), and a processor (80). FIG. 1 also illustrates optional features for any sensor device of the present invention, such as: at least one additional sensor 35, a display (81), a power supply (82), a data storage device (83), indicators or alarms (84), a data transceiver unit (85), and/or an input/output connection (86). The sensor device 10 may optionally be enclosed in a housing (not shown). The housing may be explosion-proof and/or environmentally sealed.

The embodiment in FIG. 1A comprises a non-contact temperature sensor (30) operably connected to a two degree-of-freedom motion system (20). In FIG. 1, the two degree-of-freedom motion system (20) comprises two servos. A first servo (40) is attached or coupled, either directly or through an arm, plate, or other mechanism (60) to a second servo (50). The second servo is then attached or coupled, either directly or through an arm, plate, or other mechanism (70) to sensor (30). The optional sensor(s) (35) can be attached or coupled to the second sensor, or to the arm, plate, or other mechanism (70), or the sensor(s) (35) may not be coupled to the two degree-of-freedom motion system at all.

The two servos should preferably generate rotation in orthogonal planes. In the embodiment disclosed in FIG. 1A, first servo (40) generates rotation (196) in the y-z plane (e.g., around axis (197)), while second servo (50) generates rotation (198) in the x-z plane (e.g., around axis (199)). The amount of rotation each servo requires is dependent on the application. Non-limiting examples include the following three applications. For a stand-alone unit that is intended to take measurements comprising all or substantially all of the surface of an imaginary sphere surrounding the device, a 360-degree rotating servo is preferably coupled to a 180-degree rotating servo. For a unit to be mounted along a wall in a room, a 180-degree rotating servo is preferably coupled to another 180-degree rotating servo. And for a unit intended to be mounted in a ceiling corner in a room, a 90-degree rotating servo is preferably coupled to a 90-degree rotating servo. However, other configurations of servo couplings are envisioned, depending on the application.

The sensor (30) is a non-contacting temperature sensor. Currently, the preferred embodiment of such a sensor is an infrared sensor. Generally, a sensor having a known field of view is preferred. Field of view as used in herein is interchangeable with angle of view. The field of view can be determined as $$\theta = 2\tan^{-1}\frac{w}{2d},$$

wherein θ is the field of view, w is a dimension of an area detected by the sensor at a distance d. The dimension measured by w depends on the configuration of the sensor. Typically, this will be a circular area, so the dimension will be the diameter. In other cases, for example, the sensor might cover a rectangular area, in which case the sensor might have two fields of view—one measured using the width of the rectangle, and one using the length of the rectangle.

While the sensor system (10) will function with a sensor (30) having any field of view, a sensor with a relatively small field of view is preferred. In one exemplary embodiment, the sensor unit comprises a 5-degree circular field of view temperature sensor, the MLX90614ESF-DCI digital non-contact infrared temperature sensor commercially available from NV Melexis SA. This sensor is mounted to two servos, a continual 360° rotating servo and a 180° servo, which allow measurement of all points on an imaginary sphere's surface with a single sensor.

Wind should have no effect on the accuracy of measurements of the disclosed sensor, since the sensor being used is a non-contacting infrared temperature sensor. This is an important feature of the disclosed approach and allows the application of the device to expand to outdoor spaces. The single-sensor approach is cheap and effective, as the current standard of globe thermometers becomes noisy in outdoor applications when wind is present.

The sensor system (10) may also include optional sensor(s) (35). These optional sensors may include any sensor that suits a desired application. This may include, but is not limited to, a range finder, a wind speed sensor, or a humidity or pressure sensor.

While wind speed may not have an effect on the temperature sensor, a wind speed sensor may also be optionally incorporated. As is known in the art, wind speed impacts convection rates, and thus wind speeds may optionally be used to factor into algorithms or calculations used by the system.

If the sensor device is outfitted with a depth or range finder, that sensor can provide distance information to the known azimuthal and inclinational angles, which allows the space being measured to be represented in three dimensions.

Surfaces radiant temperatures can be extracted from the overall MRT as well with this secondary piece of information.

One embodiment of the invention preferably utilizes a directional sensor as the optional sensor, where the directional sensor has a smaller field of view than the temperature sensor. In one exemplary embodiment, range finding functionality was performed by a 3° field of view LIDAR Lite sensor manufactured by PulsedLight, Inc. with a range of 0-40 in, with accuracy within 1 inch. This fits well within the 5-degree field of view of the exemplary temperature sensor.

The optional display (81) includes but is not limited to a small LCD display (such as a 16×2 LCD), a touch screen, or a monitor.

The optional power supply (82) includes but is not limited to batteries or battery packs, solar cells, or an AC power source with an appropriate converter. If utilizing AC power, a variety of options are envisioned, depending on the configuration. These options include, but are not limited to, requiring a cord to plug in to a wall outlet in some embodiments of stand-alone units, or when mounted on a wall, the device may be tied directly into a building's electrical wiring system.

A data storage device (83) may also be utilized with the sensor system (10). One skilled in the art will recognize that any appropriate storage medium is applicable here, including but not limited to RAM memory, a removable non-volatile memory card such as a Secure Digital card (SD™, SDHC™, SDXC™, or similar cards), or a hard drive or solid state drive, either connected internally, or externally through an appropriate optional input/output connection (86), such as a universal serial bus (USB) connection or ethernet connection.

The data storage device (83) contains instructions that, when executed, allow the processor (80) to control the system (10), to determine MRT, and at least one other function, which preferably is selected from the following: occupancy detection, counting objects or individuals, locating objects or individuals in a volume of space, tracking an object or individual over time and space, detection of unsafe environmental conditions, characterization of unsafe environmental conditions, tracking of unsafe environmental conditions, detection of gases, detection of liquids, characterization of gases, characterization of liquids, tracking of gases, tracking of liquids, analysis of buildings, determination of control metrics for a building or volume of space, generation of 3D and 2D models or representations of spaces and buildings using data from the sensor, generating 2D images of surfaces, generating 2D images of scenes, generating 2D images of environments, generating 3D point clouds of surfaces, generating 3D point clouds of scenes, generating 3D point clouds of environments, controlling actuators, controlling HVAC systems with data other than mean radiant temperature (MRT), informing HVAC systems with data other than MRT, controlling building systems other than HVAC, estimating a metabolic rate using surface temperature information from the sensor, estimating the thermal capacitance of living organisms, receiving input from occupants, requesting input from occupants based on data from the sensor, controlling the environmental conditions based on a combination of input from occupants and data from the sensor, calibrating energy models for heat loss and insulation levels in building simulation and analysis, commissioning building systems to ensure appropriate comfort via measurement of MRT, and quantifying and confirming energy savings and operational performance of buildings.

The indicators or alarms (84) include, but are not limited to, colored LED bulbs, a piezoelectric buzzer, and a speaker.

A data transceiver unit (85) may optionally be incorporated into the sensor device. This data transceiver unit transmits and/or receives data from an external source. This connection with the external source may be through any acceptable means, and as such, the data transceiver unit may comprise one or more connections, including but not limited to a wireless transceiver, utilizing an appropriate protocol such as an 802.11-based protocol, and/or a network interface controller, such as those used for ethernet. If via a network interface controller is incorporated, the network interface controller may utilize the optional input/output connection (86). Further, the data transceiver unit (85) also allows for data to be stored externally, such as in a cloud-based system.

Figure 1B:
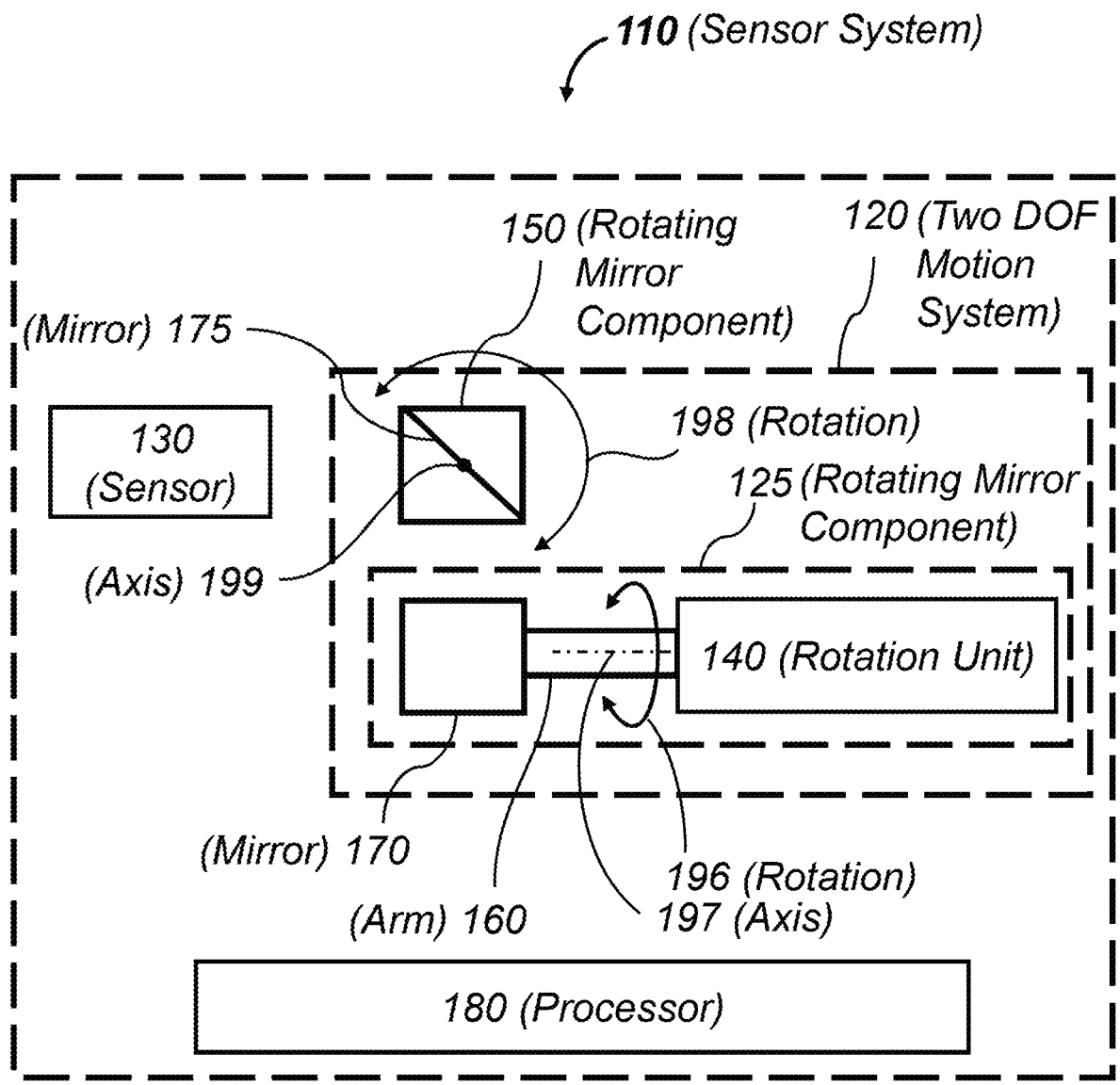

Referring now to FIG. 1B, an embodiment of an alternate two degree-of-freedom motion system is illustrated. In FIG. 1B, sensor system (110) includes a sensor (130) operably connected to a two degree-of-freedom motion system (120). The system (120) includes a plurality of mirrors (170, 175), each of which are adapted to rotate around at least one unique axis. In this case, first mirror (170) is attached via optional coupling (160) to a rotation unit (140) to form a first rotating mirror component (125). The rotation unit (140) may be any device that allows controlled rotation (196) around a central axis (197), which includes but is not limited to an electric motor. The optional coupling (160) may include, but is not limited to, a frame holding the mirror and bolted to the central drive shaft of rotation unit (140) or an extension of the drive shaft onto which first mirror (170) is attached (via, e.g., welding). In FIG. 1B, the axis of rotation (197) for first mirror (170) is the centerline of rotation unit (140), around the x-axis. FIG. 1B also illustrates a second rotating mirror component (150), which in this figure is considered to be identical to Rotating Mirror Component (125), except component is rotated such that the axis of rotation for second mirror (175) is now the z-axis (199) (e.g., second mirror (175) rotates (198) around the z-axis (199)). This configuration allows the sensor device to adjust the mirrors so as to direct infrared light emitting from or reflecting from various surfaces located in the space around the device towards the sensor (130). Processor (180) is configured to control the system (110).

Another variant of this system may utilize a single mirror that can be adjusted along two planes. Such a device could utilize one or more servos, or one or more actuators, coupled to the mirror. The coupling may occur in a variety of ways—for example, a first servo rotating in the x-y plane could be coupled to a second servo rotating in the y-z plane which is then coupled directly to a mirror.

These devices generally operate by taking a series of readings from around the device and making calculations based on that series of readings. A preferred embodiment calculates a mean radiant temperature through an algorithm that weights each reading and gives directional information for mean radiant temperature influences.

The sensor is often a single sensor, but may include multiple sensors, including an array of sensors. The sensors may be configured for discrete and/or continuous collection of data points.

Other elements may be involved in controlling the radiation seen by one or more of the sensors (including adjustment of the field of view). For example, a mirror, a lens, or a beam splitter may be used. Filters may be used to alter the sensitivity of sensors to various light wavelengths or to control which wavelengths are seen by the sensor.

Although various systems may be used to control the range of motion, in certain embodiments, galvanometers are utilized to control movement around the axes of rotation. The motion of the various systems may include, but is not limited to, continuous motor movement, or movement that is configured to stop at specified points.

The system may include sensors other than a non-contacting temperature sensor, or an interface for receiving data from those other sensors. Typically, some depth or geometry data is gathered (e.g., via a laser rangefinder, LiDAR, etc.). However, other types of sensors may be used; for example, the system may include connections to a visual camera, an air quality sensor (e.g., a temperature sensor or a humidity sensor), a sensor for gas detection, a sensor configured to detect radiation in at least one wavelength other than those used by the non-contacting temperature sensor (e.g., shortwave IR, visual light, UV, etc.), or a time of flight camera. The system may also use structured light sensors, and/or may use the SMART Sensor itself as a structured light sensor.

In addition to data from other sensors, the use of data from other sources is also envisioned. For example, it is envisioned that the system can integrate building information models (BIM) with the data from the SMART Sensor.

The processor may make calculations on-the-fly or may wait for a given scan to finish. The processor may also be configured to calculate or determine occlusion based on data from the sensors.

Figure 1C:
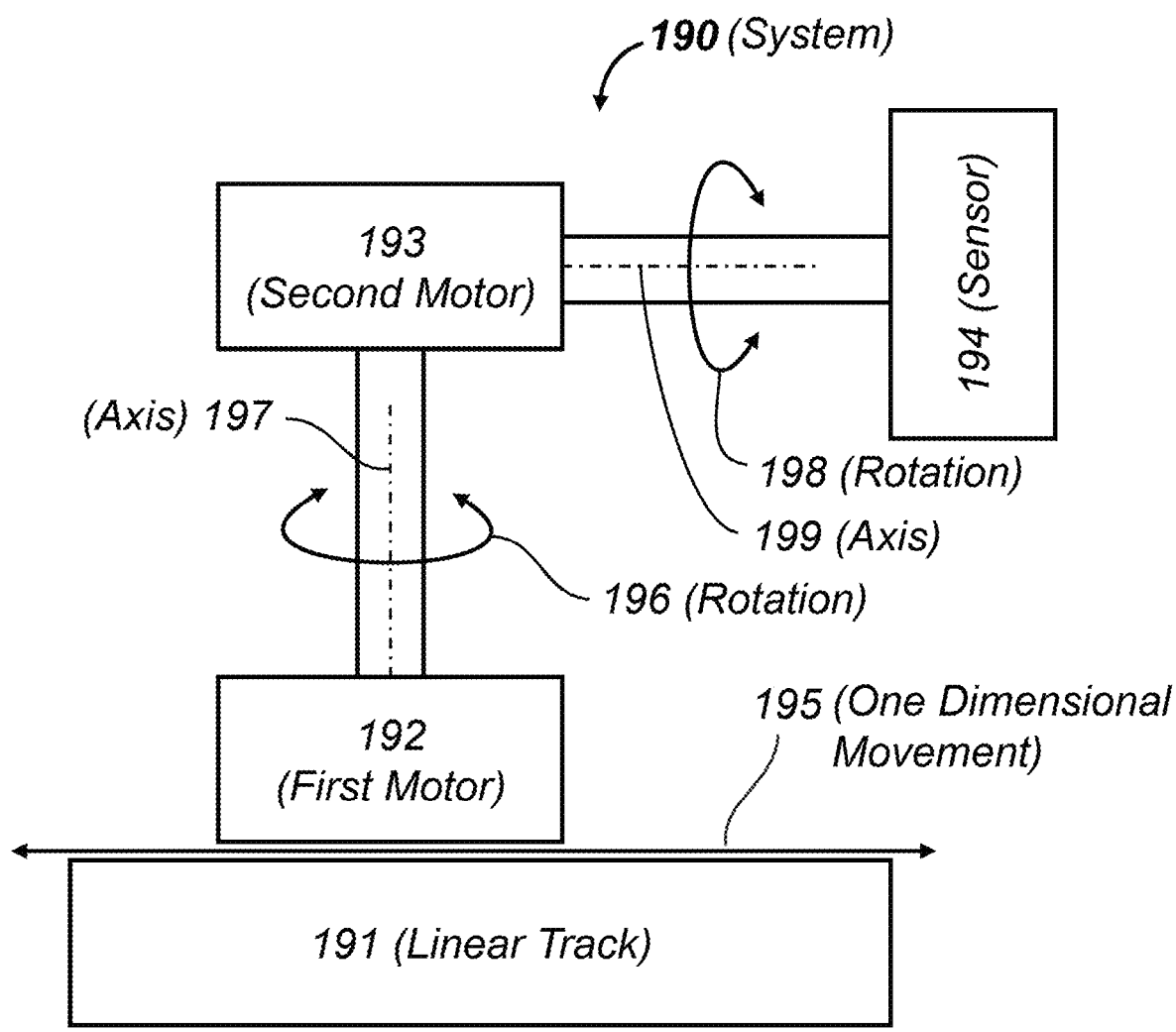

FIG. 1C provides a diagram of a system (190) configured to allow more than two axes or degrees of freedom. There, a linear track (191) is used to move the rest of the system, e.g., left to right (e.g., one-dimensional movement (195)), while a first motor (192) allows the rotation (196) of the rest of the system around a first axis (197), and second motor (193) that allows the rotation (198) of the sensor (194) around a second axis (199). Additional motors could be added to allow rotation of the sensor around additional axes, or to, e.g., allow the sensor to move linearly closer or further from the second motor (193), or to raise or lower the second motor (193) above the linear track (191).

The system may also be configured to take measurements from different perspectives (even if close together) that may allow for stereo vision and occlusion calculations. In some embodiments, two sensors work together to make occlusion calculations.

The system may be configured such that at least one sensor is moving through space during, between and/or after measurements. For example, when mounting on a robot arm, the system may scan an area that is visible from one position in space, then spin 180 degrees and scan the area from a second position in space. Similarly, when mounted on a drone or other vehicle, the sensor may be in continuous motion in space, while also continuously scanning the area.

Figure 2:
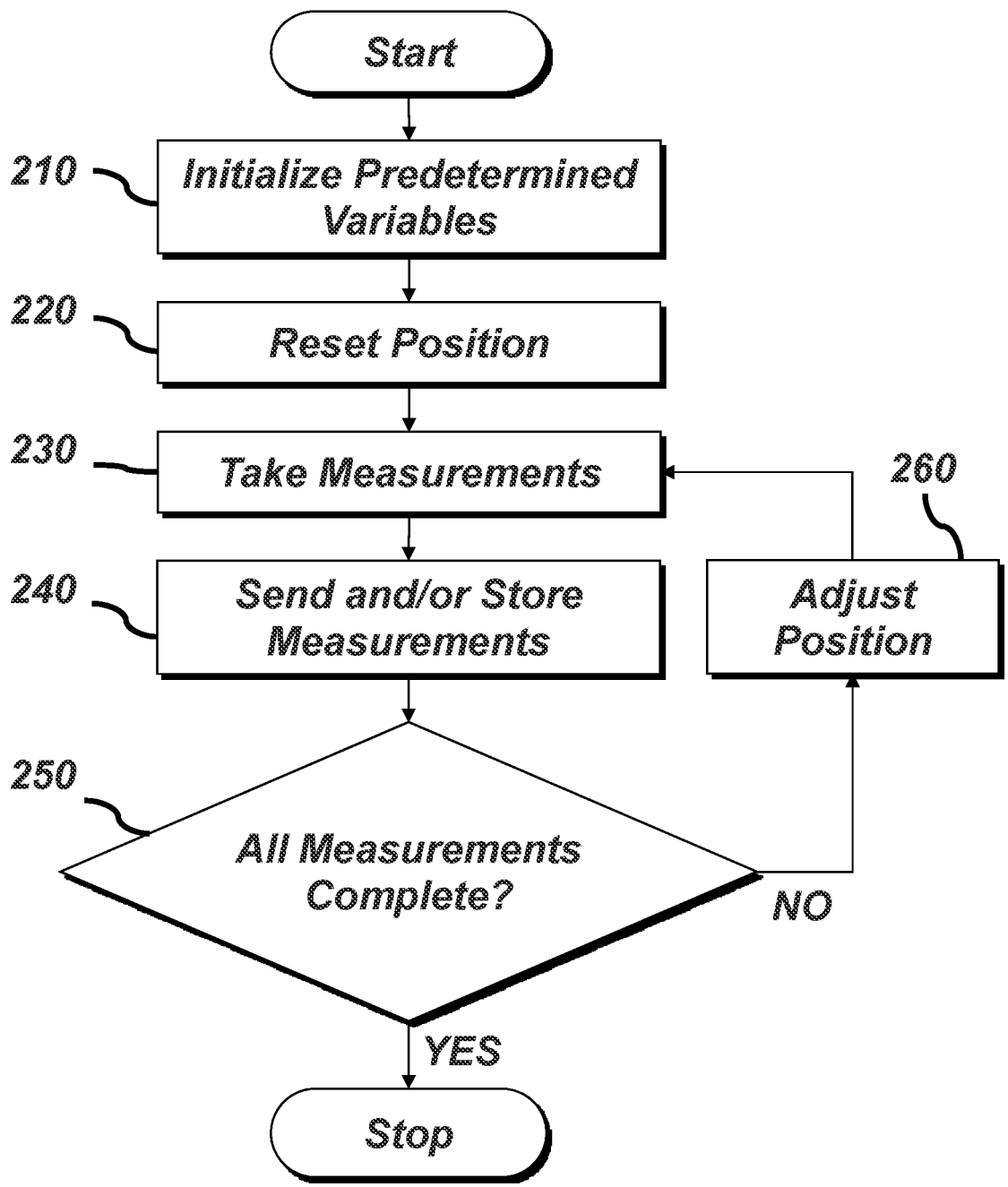
FIG. 2 is a flowchart of an embodiment of the logic used while taking measurements.

FIG. 2 discloses one embodiment for taking measurements with the device. Preferably, a microprocessor would control the actions of the sensor device, but that is not necessary.

First, at step 210 the predetermined variables are all initialized. This is typically accomplished by, but is not limited to, either being entered by a user on a computer or on a keypad on the sensor device or being read from a location in memory where the variables had been predefined. These predetermined variables may include, but are not limited to, such variables as the field(s) of view of the sensor, orientation of the device, starting position of any motor or actuator used in the two degree-of-freedom motion system, and the maximum positional values of any such motor or actuator. It may also include variables relating to where and how the measurements are to be stored or sent, or what format the data should be utilized.

Once the variables are initialized, the device begins a given set of data points by resetting its position at step 220, possibly to a starting rotation position set as one of the predetermined variables, although that is not required. The first measurement is then made at step 230. As noted previously, the measurement may include several pieces of data, which may include but is not limited to the date and time of the measurement, the angular positioning at which the measurement is being made, the range to the surface being measured, and the temperature of the surface being measured.

Depending on the exact configuration and any predetermined variables, the measurement is then stored or sent to some location in step 240. The wide range of options for how step 240 could be accomplished is well known in the art. These options include, but are not limited to: storage on on-board memory modules, hard drive, or solid state drive; storage on removable media such as a universal serial bus (USB) flash memory device; sending to a separate computer or storage device via ethernet or transmitting to a separate computer or storage device via a wireless connection. The present invention envisions a multitude of possible wireless connections;

A determination is then made as to whether all the measurements are complete. This may be done in numerous ways, which includes but is not limited to verifying if all motors or actuators are at their maximum positional values or calculating whether the number of measurements made in the set is equal to some value. That value may set earlier in this process, and may be equal to one of the predetermined variables, or, in one preferred embodiment, it may be equal to the value of either (360/FOV)*(180/FOV) or (180/FOV)*(180/FOV), where FOV is the field of view measured in degrees.

If it is determined that all measurements for the current set of data are complete, the process stops. At this point, depending on the configuration of the device, it may be necessary to save any data stored in a temporary storage location. For example, if all the data for the set of measurements was stored in random-access memory (RAM), it may be beneficial to store or send the data to a more permanent storage location.

If it is determined the measurements for the current set of data is not complete, the positioning of or within the two degree-of-freedom motion system is incremented or adjusted in step 260. This may require adjusting or repositioning components within the two degree of freedom motion system to ensure the next measurement is taken at a specific angle or specific distance from the previous measurement. The exact nature of the adjustment will depend on the configuration of the device. The adjustment may involve one or more steps, and includes but is not limited to rotating mirrors, moving an actuator, or rotating a servo motor.

Figure 3:
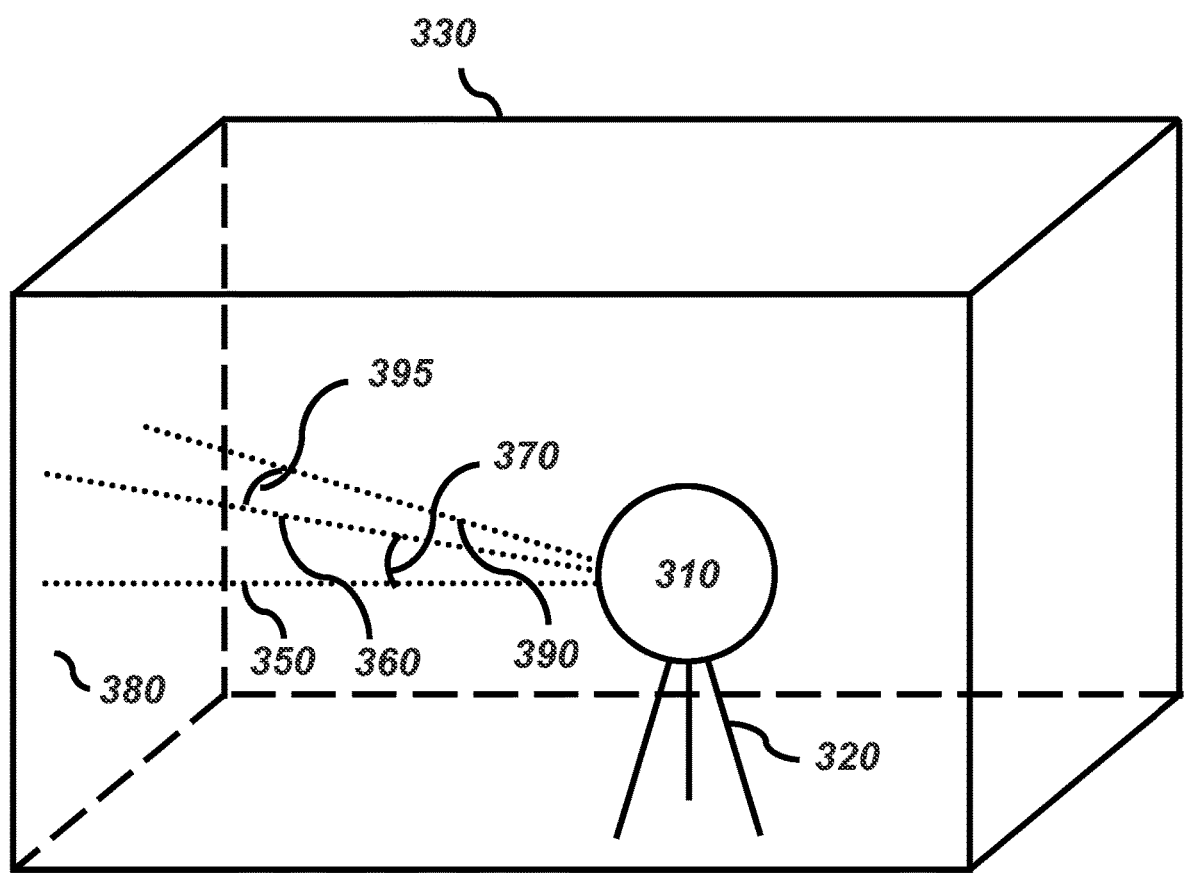
FIGS. 3-4 are diagrams of an embodiment of the present invention.

In FIG. 3, one embodiment of these adjustments is shown. Sensor device 310 is positioned on tripod 320 within space 330. Space 330 may be indoors or outdoors. The centerline 350 of a first sensor reading gathers a data point by measuring one area on surface 380. Once the first sensor reading has been captured, the positioning of the two degree-of-freedom motion system is adjusted such that the second centerline 360 is at an angle 370 relative to the first centerline. In this figure, angle 370 is in the x-z plane. One the second sensor reading has been captured; the positioning of the two degree-of-freedom motion system is adjusted such that the third centerline 390 is at an angle 395 to the second centerline. In this figure, angle 395 is in the x-y plane. In a preferred embodiment, the adjustment amount is configured so that angles 370 and 395, as measured in degrees, is substantially equivalent to the field of view of the sensor in that direction. Thus, in this preferred embodiment, the total number of measurements for a given set of readings, or from a given start time to a given end time, is at least either (180/FOV)*(180/FOV) or (360/FOV)*(180/FOV) points, where FOV is the field of view, measured in degrees, of the mean radiant temperature sensor.

Note that while adjusting the angle to be essentially equal to the field of view of the sensor is generally preferred, there may be a benefit to using other settings. For example, if the sensor captures images, and those images will be photo-stitched together at some point, a relatively small amount of overlap of the measured areas (up to 15 to 30%) between one image and the next can be beneficial—thus, in those cases, the angle would need to be adjusted to less than the field of view.

In one example of a preferred embodiment, a sensor with a 5-degree field of view is attached to a two degree-of-freedom motion system comprising a 360 degree continuously rotating servo attached to a 180-degree rotating servo. Starting with both servos at a 0-degree rotation, the 360-degree rotating servo is incremented 5 degrees following each measurement. Whenever the 360-degree rotating servo reaches 360 degrees (i.e., returning to the 0-degree rotation), the 180-degree rotating servo rotates 5 degrees further away from the 0-degree rotation. A measurement is taken, and then 360-degree rotation continues. Thus, the measurements are taken at angular positions (as measured in degrees) of (0,0), (5,0), (10,0) . . . (350,0), (355,0), (0,5), (5,5), (10,5) . . . (350,5), (355,5), (0,10) . . . (355,180), for a total of 2,592 measurement points.

Figure 4:
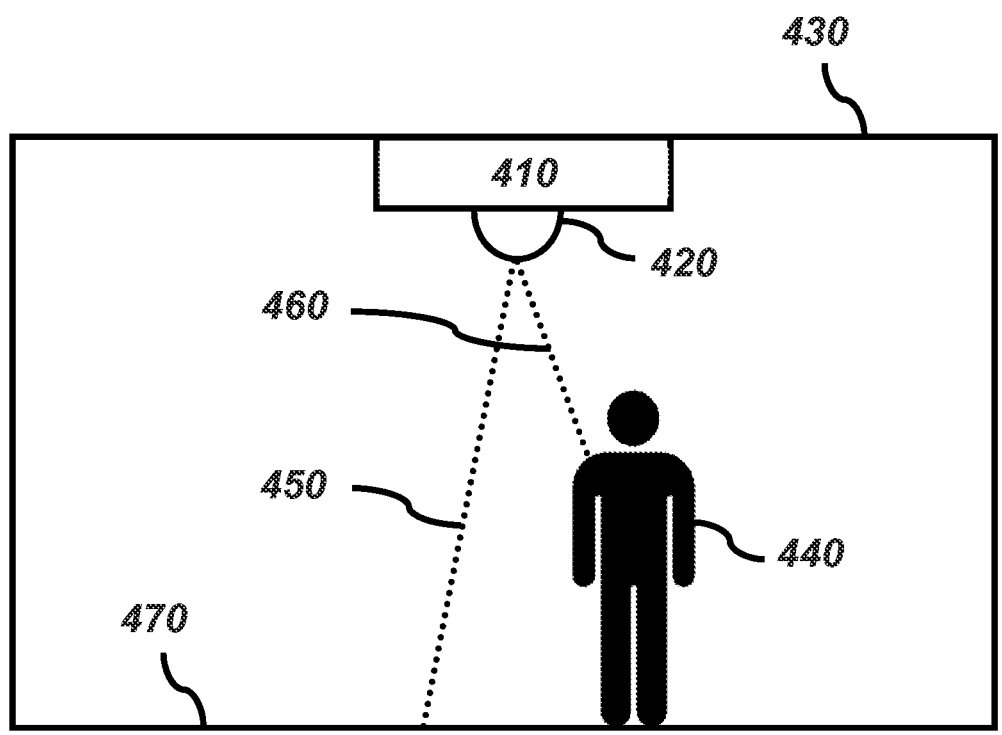

FIG. 4 discloses one embodiment of the present invention. In FIG. 4, sensor device 410 is being used to take measurements of space 430. While only a single sensor device 410 is shown, space 430 may contain multiple sensor devices, each located in appropriate positions in space 430. These multiple sensor devices may communicate among themselves, and/or may communicate with a central control system or unit. Further, space 430 is not required to be an entire room; space 430 may be outdoors, or only a small portion of a room.

In FIG. 4, sensor device 410 has an optional protective or decorative shield 420 in place. The protective or decorative shield 420 may be any appropriate geometry, including but not limited to a hemispherical dome, and may have an opening through which measurements may be taken. The shield 420 may be made of any appropriate material, including polyethylene or polypropylene.

In this embodiment, sensor device 410 may be attached or embedded in any appropriate location that will allow readings of space 430, which includes but is not limited to being attached or embedded in the ceiling, floor, or walls of space 430, or being attached or embedded in a location outside of space 430 that allows measurement of surfaces in space 430. Alternatively, a sensor unit may be temporarily placed in a location for measuring space 430, including but not limited to being attached to a tripod or being placed on a table.

FIG. 4 also shows a sensor device receiving measurements. While FIG. 4 only illustrates two measurements being taken, and the angle between successive centerlines is only illustrated as existing within a single plane, one skilled in the art will recognize that when multiple measurements are made, the angle between successive centerlines may also exist along other planes, and the two degree-of-freedom motion system may be repositioned between measurements as described previously. Typically, a temperature reading 450 is taken of one or more surfaces 470 within or around space 430. In FIG. 4, the surface 470 happens to be a floor, but the surface need not be a single surface, nor a solid surface; any surface capable of reflecting or emitting electromagnetic radiation of a frequency the sensor is designed to receive is envisioned. For example, a sensor could take a measurement of a surface of a water curtain, where the surface may be several individual streams of water. Further, in one embodiment, a temperature reading 460 is received from a surface 470, where the surface 470 is an occupant or object 440.

It must be noted that while in a preferred embodiment, the occupant is a live human being, this is not required. The occupant or object 440 may include, but is not limited to: humans, animals (e.g., at a zoo or in a barn), objects being kept at stable temperatures (e.g., meat in a walk-in meat locker, wine bottles in a wine cellar, or packaging in a pharmaceutical stability test chamber), or sensitive test equipment.

Further, if the occupant is human or animal, the reading may be from any portion of the occupant's body and may include either clothed or unclothed portions of the occupant's body.

Figure 5:
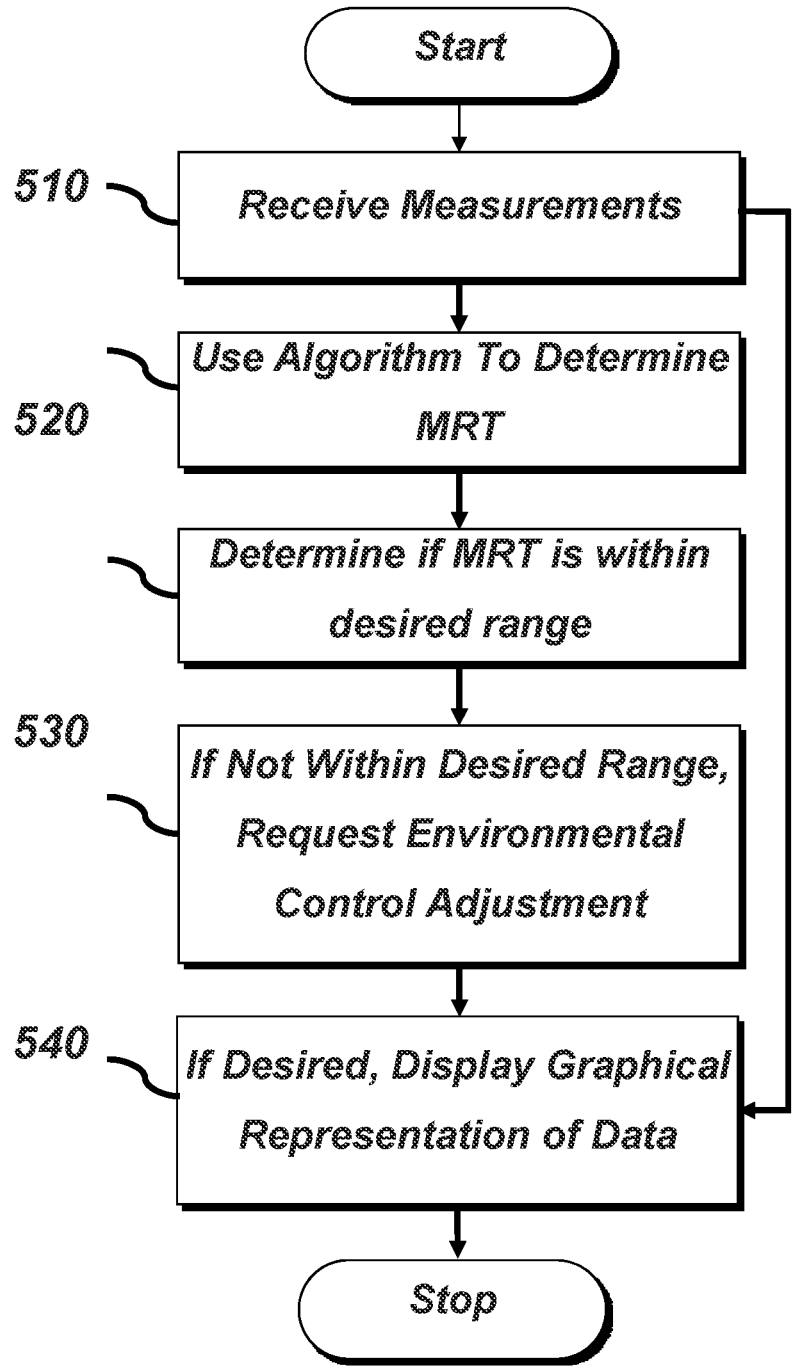
FIG. 5 is a flowchart describing an embodiment making calculations and displays based on the measurements.

Referring now to FIG. 5, there are additional steps that could be taken to provide additional benefit for users. First, the measurements must be received in step 510. This may take many forms, including but not limited to sending the data to a microprocessor onboard the sensor unit, sending the measurements to a computer wirelessly or through an ethernet cable, or by removing storage media from the sensor unit and plugging it into a computer.

Once the measurements have been received, step 520 requires the use of an algorithm to determine the mean radiant temperature of a space. The algorithm utilizes a latitudinal and longitudinal weighting procedure. Numerous variations can be utilized here; for example, weighting can occur for a standard sphere, such as a standard globe thermometer, to determine the measurement a globe thermometer would record without wind or elongated to an ellipsoid or another shape to mimic the perception of a human body. One preferred embodiment uses the following latitudinal and longitudinal weighting scheme:

Latitudinal Weighting

Weighting latitudinal measurements requires knowing the relative area of a set of latitudinal measurements on the imaginary sphere's surface compared to the surface area of the entire sphere. To do this, use r to represent the radius of the sphere, θ to be the 0 to 360°, or 0 to 2π, azimuthal angle, and φ to represent the angle of inclination, ranging from 0 to 180°, or 0 to π radians. Additionally, use δ to represent the field of view of the sensor. Since angles and relative surface area are involved, the relative surface area of a ring compared to the overall spherical surface area will be the same regardless of radius, so the choice of radius should not matter. If one divides the sphere into latitudinal segments equal to δ, then there are 180/δ latitudinal regions. More precise treatment to the algorithm must be given if 180 is not a multiple of δ. To calculate a relative weighting factor for radiant temperature measurements in an arbitrary latitudinal ring, the following formula is employed.

$$\frac{2\pi r^2 \int_\varphi^{\varphi+\delta} \sin x\, dx}{4\pi r^2} = \frac{1}{2}\int_\varphi^{\varphi+\delta} \sin x\, dx = \frac{1}{2}[-\cos x]_\varphi^{\varphi+\delta} \quad \text{(Eq. 1)}$$

This works for any sphere of radius r, and the equation inside the initial integrand can be changed to allow for the weighting of an ellipsoid (to simulate a human body) or any other shape with known equation.

Longitudinal Weighting

For the same coordinate system, it should be known the size of the path carved out in the azimuthal rotation compared to the field of view to determine the longitudinal weighting scheme. For example, in the latitudinal band from 0 to $\delta$, even for small $\delta$ there is significant overlap between measurements. Therefore, one must determine the average circumference of the latitude given by $$2\pi r^2 \sin\left(\frac{\varphi + \varphi + \delta}{2}\right)$$

and the number of divisions separated by the field of view, given by $$\frac{360}{\delta}$$

Therefore, each measurement should be weighted by simply multiplying each measurement by $$\frac{2\pi r^2 \sin\left(\frac{\varphi + \varphi + \delta}{2}\right)}{\frac{360}{\delta}} \quad \text{(Eq. 2)}$$

to reduce the weight of each measurement by the fraction desired. Then, the same fraction of wedges symmetrically before and after must be added until the field of view is composed of fractional measurements.

Final Algorithm

In this scenario, longitudinal weighting occurs first to create a new array of values, followed by latitudinal weighting, although that is not required.

Weighting scenarios do not require a fixed number of data points, generally a (360/FOV)*(180/FOV) or (180/FOV)*(180/FOV), where FOV is measured in degrees, maximum number of points. The number of points is specific to the latitudinal and longitudinal weighting scheme. The disclosed approach is not limited by geometries or weighting schemes. Points have been developed for other options, including but not limited to using the sensor to measure with equal weights (geodesic distribution with points depending on the FOV), as well as a sweeping motion where measurements are only taken after the sensor travels a path that defines a unique view, given simply by Eq. 2. Additionally, the weighting algorithms are not limited to the abovementioned sensor information. For example, range information or other sensor data may be included in the weighting schemes above to further refine the MRT calculation.

Other latitude and longitude weighting schemes are envisioned. For example, another weighting scheme uses a geodesic measurement distribution. In such a scenario, measurements of surface temperature, distance, and servo or mirror positions are taken only after the sensor have traversed a predetermined distance. This distance is given by the following formula.

$$360 \times \frac{\tan\left(\frac{FOV}{2}\right)}{\pi \cos\theta} \quad \text{(Eq. 3)}$$

wherein FOV is the field of view of the sensor, measured in degrees, and $\theta$ to be the 0 to 360°, or 0 to $2\pi$, azimuthal angle of rotation. This formula calculates the distance that needs to be traversed such that there is no overlap between readings. The benefit to this geodesic pattern is that the MRT is simply the average of all readings for a full measurement, and there is no need for additional weighting. We expect this equation can be used to produce measurements that are in constant longitudinal steps, but horizontal steps differ as given by Eq. 3.

Once the MRT has been determined in step 520, it can then be displayed to a user, either on a computer display or on a display on the sensor device. Further, in step 530, a determination can be made as to whether the MRT is within a desired range. Preferably, this would be the comfortable range for humans, which is well understood in building science. However, depending on the purpose of the space, that may not be the appropriate range.

If the MRT is not within the desired range, step 540 involves requesting a change in the environmental controls for the space. Control systems are well known in the arts; and how this is accomplished will depend on the configuration of the systems involved. Preferably, a signal containing at least the MRT is required to be sent to a separate control unit. In spaces involving multiple sensor devices, such a configuration would likely be required, as conflicts between signals could be confusing for an environmental system (e.g., if a device on one side of a space is requesting the temperature be raised while a second device on the opposite side of the space is requesting the temperature be lowered). However, as one alternative, a microprocessor on the sensor device could compare the MRT with a predefined target MRT, determine the appropriate change in temperature, and send a signal to a separate control unit requesting that the temperature in the space be raised or lowered by an appropriate amount.

Other factors and communication between sensor units is envisioned as well. As one example, the microprocessor on a sensor device could first determine whether there are occupants near the sensor, or how many occupants are near the sensor. If so, the microprocessor would determine if the occupants are comfortable based at least partially on the MRT. If not, the sensor unit would communicate with any surrounding sensor units to determine what adjustments should be made. If all the sensors with occupants near them have MRTs that are too warm for comfort, the temperature would need to be lowered by an amount that would keep most people in the comfort zone. But if there is a conflict, the determination could be made by giving weight to the number of occupants near each sensor, i.e., if most people are too warm, and only a handful are too cold, the temperature would be lowered to an amount that kept the most people comfortable. Depending on the configuration of the environmental system, the microprocessor may simply adjust the temperature setting directly, or may request that the temperature setting be adjusted by a certain amount.

If desired, and exclusive of other steps, once the measurements have been received, step 550 may occur and a graphical representation of the data may be displayed. In an industrial setting, this is done at a centralized location, such as on the computer of a facilities manager. The display may be a two-dimensional map, or a three-dimensional representation of the surfaces and surface temperatures in the space. The software requirements for graphically displaying data are well known in the arts. This device and system enable, among other features, near real-time generation of graphical displays of a given space, allowing a user to make determinations about how well a facility's heating ventilation and air-conditioning (HVAC) system is functioning, or to predict or prevent HVAC problems from occurring or respond quickly when such problems do arise.

A system for determining mean radiant temperature is also disclosed. The system includes a non-contacting infrared temperature sensor and a two degree-of-freedom motion system. However, the two degree of freedom motion system may be comprised of a first and second rotating component, each adapted to revolutions of up to at least 90 degrees on a first and second plane to the sensor, respectively. In a preferred embodiment, the two rotating components rotate 180 degrees and 360 degrees, respectively.

The system also includes a microprocessor. The microprocessor may be an onboard chip or on a separate computer. The microprocessor is adapted to direct the two rotating components such that sensor measurements can be taken comprising all or a fraction of the surface of an imaginary sphere surrounding the device. This is typically accomplished using a method of alternatively taking a reading, and as previously described, preferably in accordance with FIG. 3.

The rotating components may be any two components that, together, provide a motion system having two degrees-of-freedom. This may include, but is not limited to, two rotating servos coupled to each other, or a pair of rotating mirrors, where each mirror is coupled to an electric motor.

The microprocessor is also adapted to receive at least a temperature reading and determine directional information corresponding to each temperature reading. This may be accomplished simply by reading the positional information of the two degree-of-freedom motion system with the temperature reading taken at that position. As one alternative example, the temperature readings and positional data may be sent from a sensor device to a computer wherein the data packet or packets being sent contain the temperature reading and positional data. In such a case, the microprocessor must utilize an appropriate algorithm for reading the appropriate data in the data packet(s), based on the format of the packets. The microprocessor then calculates a mean radiant temperature as a weighted average of the received temperature data points, per a method as described previously, and outputs the mean radiant temperature.

This system may also comprise a range finding sensor, wherein the microprocessor is further adapted to receive a range data point from the range finding sensor corresponding to each temperature reading. That range data may optionally factor into the calculation of the mean radiant temperature.

The mean radiant temperature may also optionally incorporate one or more sensors. In such cases, the algorithm may utilize a filter for a given temperature reading to determine whether identical or overlapping surface temperature readings are being presented. This filter may involve the known location of the sensors along with the positional data, and preferably also range data. In one embodiment, such an algorithm uses the known location of the sensors, the positional and range data for a given temperature reading to determine an absolute position within a given space. The absolute position for each temperature reading for all sensors within a given space is determined. As each position is being determined, the distance to all other known absolute positions already determined is calculated. If that distance is determined to be within the field of view of the sensor, it is considered to "overlap". In such cases, the algorithm may deal with the identical or overlapping readings in an appropriate manner, including but not limited to averaging them or selecting the highest or lowest temperature recorded.

This system may also include a display for outputting a plot comprising the temperature readings. Preferably, the plot will display a three-dimensional representation of the surface temperature data within a given space and may incorporate data from one or more sensors. Graphing software is well known in the industry. One skilled in the art will recognize that the use of any appropriate graphing software, whether commercially available or developed specifically for this system, is envisioned.

Additional Applications

In addition to measuring MRT, the systems' ability to map temperatures to x, y, z coordinates allow the system may be used in a variety of applications and fields, although the exact configuration of the system will be dependent on the exact field and application.

Additional sensors may be added to the system, and preferably are also operably connected to the two or more degree-of-freedom motion system.

Occupancy Detection

Figure 6A:
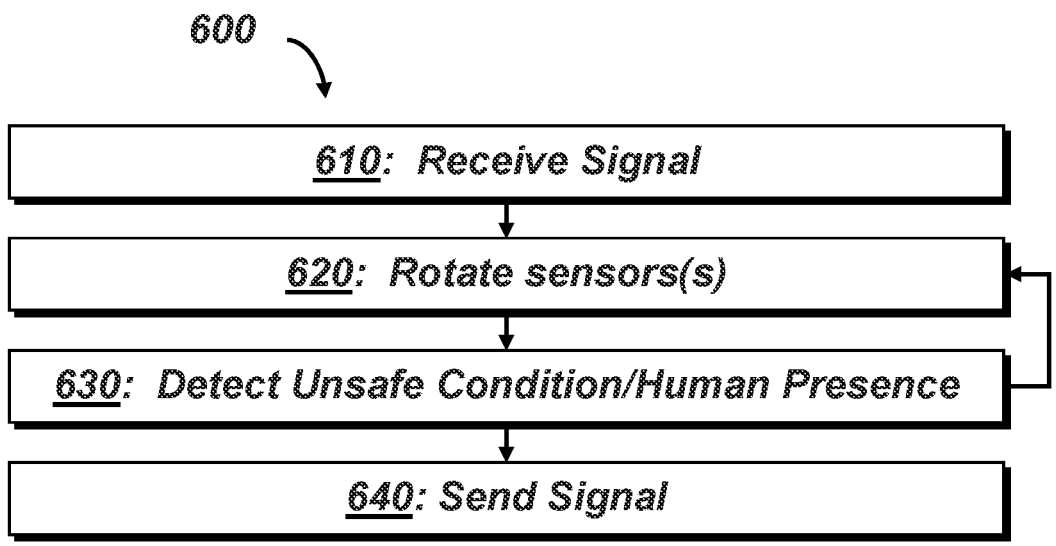
FIGS. 6A and 6B depict a flowchart for an embodiment configured to detect unsafe conditions and/or human occupancy.

The systems may contain instructions that, when executed, allow the system to detect occupancy, count objects or individuals, locate objects or individuals in a volume of space, and/or track an object or individual over time and space. FIG. 6A provides a general flowchart for how an embodiment of such a system could be configured. This embodiment of occupancy detection may include configuring the system to find people in emergency situations. In this embodiment (600), the processor is optionally configured to receive (610) a signal indicating an emergency situation is or may be occurring (e.g., a fire in a large warehouse). If this optional signal is received, the processor then may optionally stop performing any efforts to calculate MRT and instead focus solely on the emergency. Alternatively, this optional step may be what triggers the sensor to begin the emergency condition detection functionality. In other embodiments, no additional signal is needed—the system continuously checks for human occupancy and/or unsafe conditions.

The system may first rotate (or otherwise adjust the positioning of) the sensors in the system (620). This is typically done by adjusting a servo, motor, actuator, or other component of the two or more degree-of-freedom motion system.

Figure 6B:
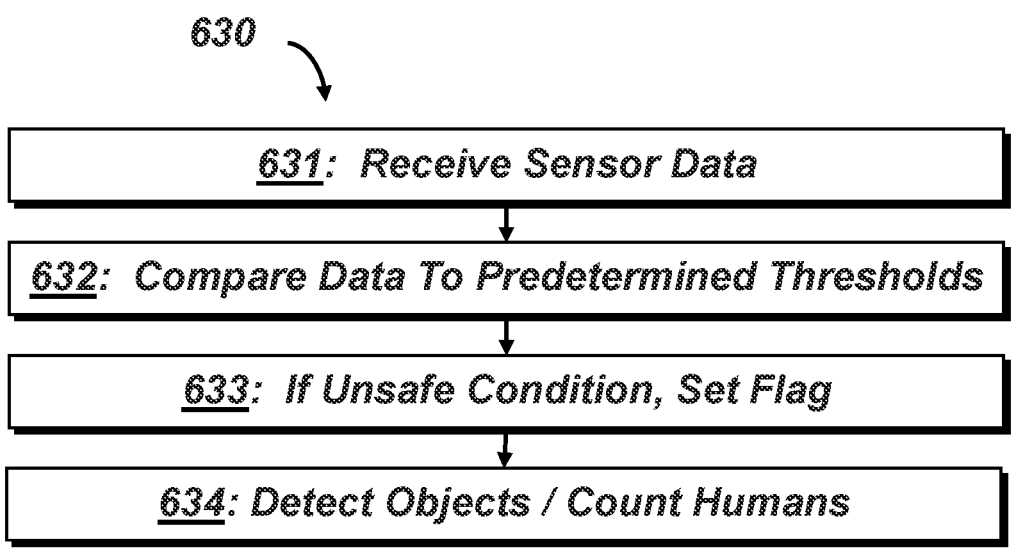

The system may then detect an unsafe condition and/or the presence of a human being (630). Some additional detail of a configuration capable of detecting an unsafe condition and/or the presence of a human being is shown in FIG. 6B. The processor first receives data from the sensor (631). In this example, the data is compared on a pixel-by-pixel basis to predetermined temperature thresholds (632).

Figure 7:
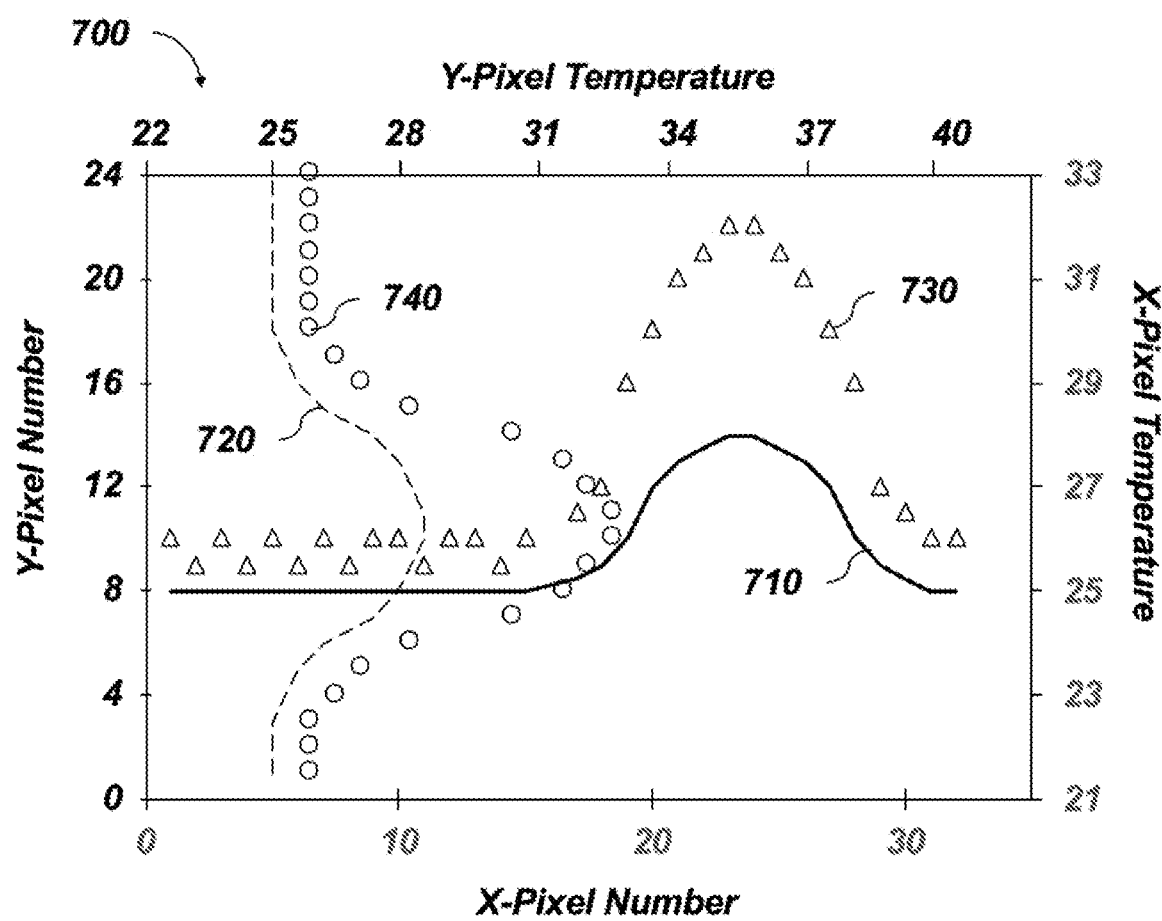
FIG. 7 is a temperature pixel map, showing x-pixel position vs average and maximum temperature detected, and y-pixel position vs average and maximum temperature detected.

An example of this is shown in FIG. 7. FIG. 7 provides a visual temperature pixel map (700). In this example, a single 24×32-pixel sensor reading is considered, and the average (710) and maximum (730) temperature of the x-pixels, and average (720) and maximum (740) temperature of the y-pixels are determined. In this example, if the average x-pixel temperature is >26 but <30 degrees C. for a person's width, and the average y-pixel temperature is >26 but <30 degrees C. for a person's height, and the maximum x-pixel temperature and/or maximum y-pixel temperature is >31 degrees C., then a person is considered to be detected. LiDAR can be used to extract absolute distance, and therefore, e.g., the width of a person can be determined. If the (x, y, z) coordinate of a person-qualifying point moves, such as moving more than 0.25 m/s as calculated in successive frames, it may be classified as a moving person. Referring back to FIG. 6B, in some embodiment, if a person (or unsafe condition) is detected, the processor sets a flag (633) for, e.g., fire equal to 1, or increases a counter for number of people (634) by 1.

In other embodiments, known object detection techniques can be used to detect objects in the image, and if, based on the range to the object, the size of the object approximates that of a human and the temperatures are in an expected range (such as between about 35 and about 40 degrees C.) the object may be considered human.

While the system may continue scanning and tracking or detecting occupants, the system may also track occupants (people or objects) without scanning. This may be informed by other sensors beyond the non-contacting thermal sensor that are either separate or incorporated into the system. For example, a visual camera may be used to find areas of interest that the thermal sensor will then scan. In some embodiments, the system can track a single individual by, e.g., once the position of a contour of a person has been identified, taking a scan of just the area surrounding the detected individual, large enough to detect the individual even if it has moved, and repeating as needed, ideally keeping the individual substantially centered in the scanned area. In other embodiments, the system may capture two or more thermal images of a given contour and use those thermal images to determine direction and velocity. With that information, the system can estimate the rotation needed to capture another thermal image that will still "see" the contour, then repeat the estimating and capturing as needed.

Detecting/Characterizing/Tracking Unsafe Environmental Conditions

Detecting unsafe conditions may be done in a variety of ways, including having unsafe condition temperature thresholds (e.g., "potentially too cold for human safety" could be temperatures below 64° F., "potentially too hot for human safety" could be temperatures above 90° F., "too cold for building safety" could be temperatures below 32° F., and "too hot for building safety" could be temperatures above 130° F., or 200° F., or 300° F., or 400° F., or 500° F. The unsafe conditions can include environmental conditions that are unsafe for non-human purposes (e.g. too cold for a type of plant or animal, too hot for food storage etc.).

In some embodiments, a single temperature reading in an unsafe range is sufficient to be considered problematic (e.g., a single spark being detected in a room of highly flammable materials). In other embodiments, multiple temperature readings in these ranges is required (e.g, some temperatures are only unsafe if they persist, so a single potentially unsafe reading by itself may not be troubling). In other embodiments, the condition must persist at a given location for a single scan. In still other embodiments, the condition must grow or otherwise alter itself in some way in successive scans. For example, if a kerosene space heater is used to heat up a particular area in a warehouse, the surfaces may reach temperatures that reach the "too hot for building safety" threshold described above. However, because the kerosene heater is not "moving", some embodiments may determine that this is a stationary heat source. In certain embodiments, the size of the that would not be considered an "unsafe condition" unless the profile of the temperature readings relating to the area around the kerosene space heater changed showed a statistically significant change. For example, at a given area of the warehouse, if there are 10 contiguous pixels indicating a temperature above an unsafe condition threshold in repeated scans, and the next scan shows there are 20 contiguous pixels above the threshold, there is cause for concern.

In some embodiments, the processor includes information from a database or other source describing the building or location when determining whether a condition is unsafe. For example, in a location that is surrounded by bare concrete, what is considered "unsafe" may be different from a location that has plush carpeting and relatively flammable walls or ceilings, which may be different from a location where flammable gases are stored, etc.

In some embodiments, the thresholds can be used to detect unsafe conditions in the walls, or on the other side of a wall or door. For example, if a fire is present on the other side of an interior door or wall, that interior door or wall may appear to the system as having a warm spot or otherwise being warmer than expected (such as warmer than a predetermined threshold, or warmer than the rolling average temperature over the last, e.g., 24 hours), even if the actual measured temperature would not necessarily enough to otherwise indicate the presence of a fire.

Similarly, for system that are configured to detect human occupation, temperatures within a defined temperature range can be used to indicate the presence of one or more human beings. In preferred embodiments, the system counts the number of human beings in the area it can detect. It may do so by, e.g., using known image processing techniques to separate and identify human beings. For example, the system could be detecting if new objects enter the field of view and determining if they are human-shaped. If so, the system could create bounding box coordinates for the human-shaped object, compute a centroid of each, then tracking the object in the field of view by, e.g., when comparing a first scan to a successive scan of the same area, assuming that centroids with minimum Euclidean distance between them are the same object. By tracking the humans, an accurate count can be maintained.

Once an unsafe condition is noted, the SMART sensor may then send a signal (including, but not limited to, text messages or emails) to one or more individuals or other systems. This may include, but is not limited to, a point of contact, an administrator, a central server, or emergency services. The signal (or message) that is sent may specifies, e.g., a location of the particular sensor (which may be, e.g., the actual GPS coordinates, and/or may be just an assigned name of the location, such as "laboratory 3-3" or "south corner of warehouse", etc.), the unsafe condition such as that indicated by any flag, and the presence and/or number of individuals at the particular location within the building.

Similarly, the unsafe condition can be tracked within the detection space of a given sensor—that is, the sensor can detect an unsafe condition (such as a fire) and track where it has spread within a given space.

In other embodiments, two or more SMART sensors positioned around an area may communicate and transfer information related to a given location in order to provide a more complete picture of the covered areas, where the fire has spread to, and where people who might need rescuing are located.

In that way, when fire departments arrive at the fire and begin to plan, they would be informed of not only know whether people are still inside, but also whether they are still alive, where they are located, whether there is a clear route to get to the people, and whether the fire has spread to areas known to contain potentially explosive hazards (e.g., compressed gas tanks, etc.).

Detecting/Characterizing Gases/Liquids Different gases and/or liquids in a given environment affect reflectivity, emissivity and/or transmissivity in ways that may be detected (either manually or automatically), characterized, and/or tracked using the SMART Sensor.

In some embodiments, the detection of the release of any gas is the only requirement, while in others, detection of specific gasses may be desirable. Thus, for example, a SMART sensor could be configured to take measurements using a particular set of predefined wavelengths, and the responses for each wavelength can be compared to a known profile for a given compound. So, a SMART sensor could be used in homes that acts as not only a fire alarm, but also as, e.g., a natural gas leak detector.

In one example, an infrared system uses at least one optical bandpass filter prior to the detector, where at least part of the aggregate pass band is within an absorption band for one or more chemicals. By filtering for specific absorption bands, the detector can readily detect specific predetermined chemical(s). For example, in the 750 nm-6000 nm range, methane has three major absorbance bands where the IR absorbance is significantly higher than at adjacent wavelengths—roughly 1.6-1.7 µm, 2.2-2.4 µm, and 3.1-3.6 µm, In this example, when the system detects sufficient signal in those ranges, it can signal to an operator that methane has been detected.

Alternatively, the SMART sensors can be used to detect changes in surfaces—such as liquids on surfaces. So, if a pipe bursts, and water starts covering a floor, the SMART sensor can detect the difference (e.g., by comparing a surface temperature to a previously measured surface) and can notify or alert individuals as needed. In some embodiments, the SMART sensor first detects if a cool area has suddenly appeared by determining if a particular spot has a temperature that has changed more than 5 degrees from the previous scanned image, and if so, uses image processing software to configure an outline of the cold area and to estimate the volume of space or surface area the cold area encompasses. The SMART sensor may then scan the area a third time to determine if the cold spot has grown in size or changed shape, indicating a spill has occurred or is in the process of occurring. If the cold spot has not changed size or shape, it may be flagged as a cold object in the room, rather than a spill. For example, if a person in a room places a cold water bottle on a desk, the SMART sensor will detect that a cold area has suddenly appeared, but since it has not grown in size or shape when the sensor scans it again, the sensor flags it as not being a spill.

The sensor can track where the gases or liquid are within a room. When working with multiple sensors, the sensor can also determine if the presence of the gas or liquid is a new leak, or if the leak has spread from an adjacent area. For example, if a sensor monitoring one half of a basement area detects a large amount of water leaking into the area, and within a fixed period of time, water is detected by a sensor monitoring an adjacent area the sensor can assume there is one large leak, as opposed to two separate leaks. Further, in addition, the SMART sensor can also track and locate gas leaks using the geometry/lidar information. For example, it can track where in a room the gas or liquid leak is.

Further, gases can also be detected based on their impact on the surface temperatures behind the cloud. For example, the system can determine if the wall behind a leak appears to be a different temperature due to the absorption/transmissivity of the gas.

In one embodiment, liquid detection is based on the concept that liquids pull surfaces towards the wet bulb temperature because of evaporation. In one embodiment, the system detects the presence of a spill based on a profile of temperature changes matching that expected during evaporation.

Occupant Comfort Detection

In some embodiments, the processor is configured to allow the estimation of human (or animal) metabolic rate using surface temperature information from the sensor and may also include estimating the thermal capacitance of living organisms, using the metabolic rate and information from the sensor system.

Figure 8A:
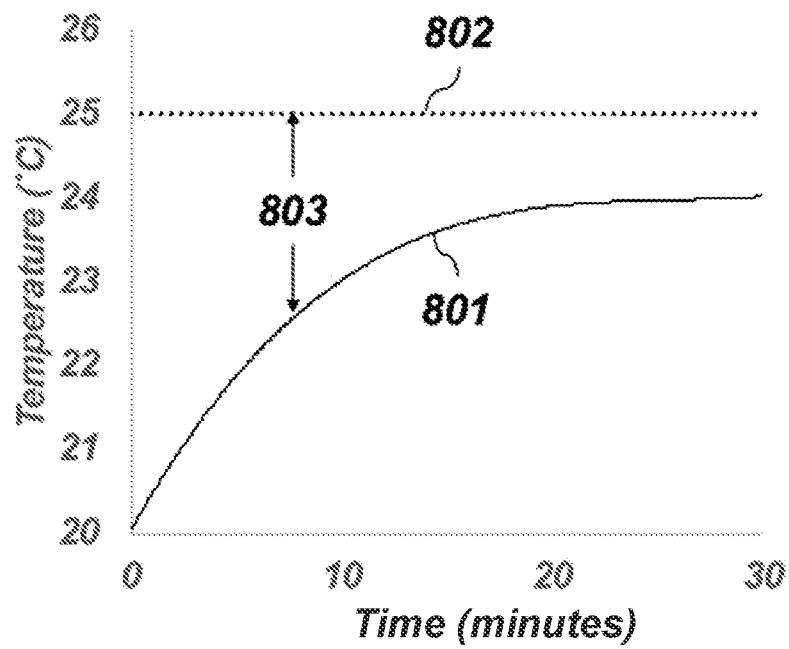
FIG. 8A is a graph for estimating thermal capacitance given a surface temperature and an environmental temperature.

To estimate the thermal capacitance of a person or surface with a single sensor, the sensor repeatedly scans a detected person or surface and tracks an environmental temperature, generating data similar to what is seen in FIG. 8A, showing a feature temperature (801) and the environmental temperature (802) over time, such that there is a difference (803) between the two temperatures. As thermal capacitance=thermal generation–thermal shedding, the thermal capacitance of the person or surface will be proportional to the time derivative of the feature temperature.

Figure 8B:
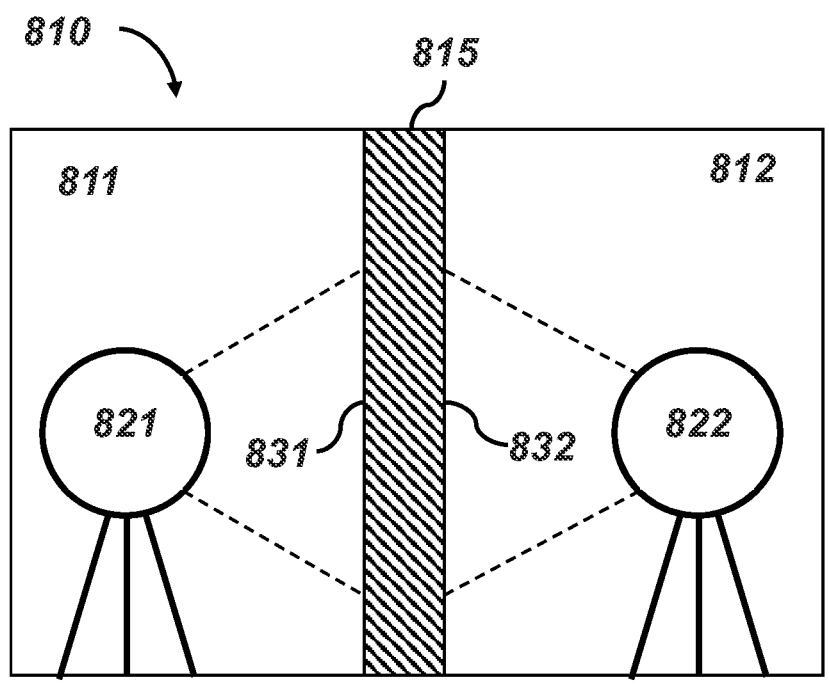
FIG. 8B is a diagram of a system for estimating thermal capacitance or resistance.

Another embodiment for estimating thermal capacitance or resistance of, e.g., a wall, utilizes two sensors. As shown in FIG. 8B, in a system (810) where there are two rooms (811, 812) separated by a wall (815), the first room (811) have a measured air temperature $T_{air,1}$ and the second room having a measure air temperature Tair,2, a sensor (821) in the first room (811) can measure a first surface of the wall (831) and having a surface temperature $T_{surf,1}$. A sensor (822) in the second room (812) can measure a second surface of the wall (832) having a surface temperature $T_{surf,2}$. Using this type of arrangement (810), consider two different conditions.

Figure 8C:
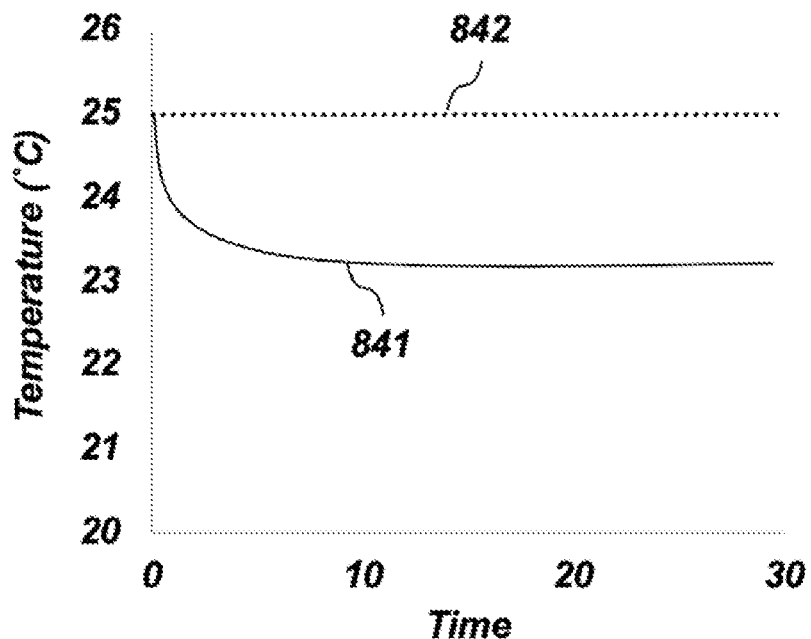
FIGS. 8C and 8D are graphs for estimating thermal capacitance or resistance based on knowledge of two surface temperatures.

In the first condition, rooms 1 and 2 are at a steady state temperature, and then the air conditioning is turned on in room 1 only (811). As seen in FIG. 8C, $T_{surf,1}$ (841) and $T_{surf,2}$ (842) can be measured repeatedly over a period of time. As R-value of insulation measures the ability of heat to transfer from one side of an object to another, the insulation R-value is proportional to $T_{surf,2}-T_{surf,1}$. The processor can then estimate the R-value and/or the thermal resistance based on that difference.

Figure 8D:
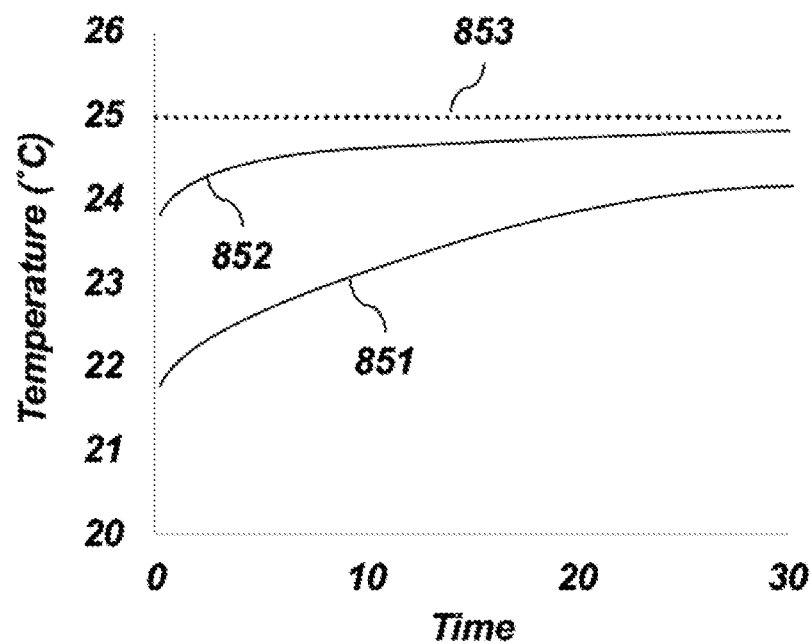

In the second condition, rooms 1 and 2 are being cooled, and then either the cooling is turned off, the windows in both rooms are opened to the outside, or something similar, where the air temperature in both rooms equalizes relatively quickly (e.g., so outside temperature=$T_{air,1}$=$T_{air,2}$). As seen in FIG. 8D, the temperatures of the two surfaces (851, 852) will then change towards the outside temperature (853) over time. Capacitance is proportional to (Outside Temperature–$T_{surf,2}$)R and (Outside Temperature–$T_{surf,1}$)R, where R is the R-value of any insulation in the wall.

Figure 8E:
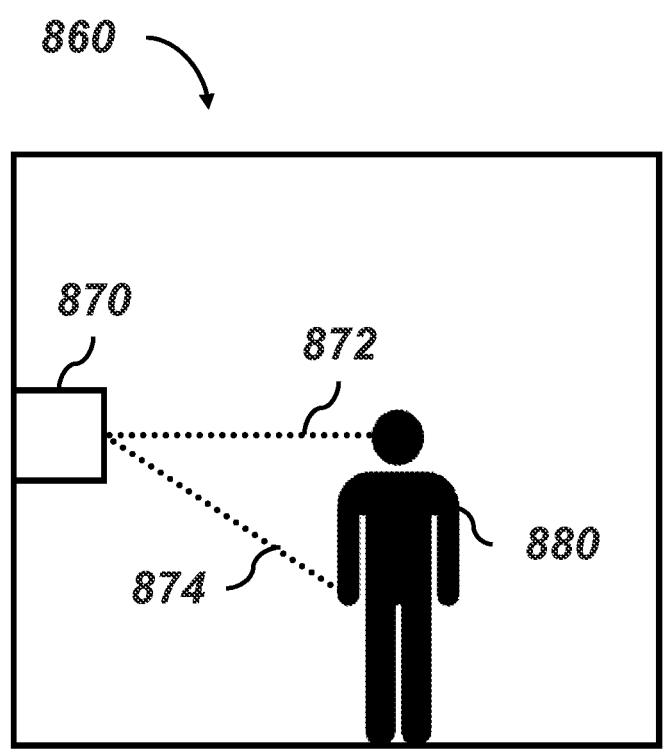
FIG. 8E is a diagram of a system for estimating metabolic rate of a subject.

Referring to FIG. 8E, embodiments of the system (860) may also be configured to estimate metabolic rates. For metabolic rates in humans, the sensor (870) first gathers a temperature of the face (872) and a hand (874) of a human (880). These two temperatures are compared in a lookup table in order to determine a metabolic rate.

With the metabolic rate in hand, the system may also make decisions about how to control the local environment. For example, the system may then measure and calculate the heat loss an occupant is experiencing. If the heat loss minus the metabolic rate is less than a threshold, nothing needs to be done. If the heat loss minus the metabolic rate is greater than or equal to a threshold, the system may change, or request a change in, one or more aspects for the local environment. For example, the system may adjust air temperature, adjust air speed, adjust mean radiant temperature, alert the occupant to change some activity they are performing (e.g., perform a more rigorous activity) and/or alert the occupant to change clothing (e.g., put on warmer clothing). In certain embodiments, the threshold is based on a percentage of the metabolic rate (such as 8%, 10%, 12%, 15%, 20%, etc.), and/or a particular amount of power (such as 5 W, 8 W, 10 W, 12 W, etc.). In preferred embodiments, the threshold is 10% of the metabolic rate, or 10 W, whichever is larger.

In some embodiments, the sensor is configured to receive input from occupants and/or request input from an occupant based on data from the sensor. For example, in some embodiments, when the system feels the conditions are borderline with respect to occupant comfort, the system may ask (via a prerecorded message, etc.) whether the occupants are comfortable. These responses may be used to, e.g., train a machine learning algorithm on what conditions in a particular location are acceptable to occupants. For example, in a manufacturing facility where occupants where fire-retardant clothing, the occupants may desire working conditions that are colder than normal. Similarly, in certain buildings, it may be impossible to control rooms independently, and user input may be needed to find conditions that allow every room to be acceptable for all occupants. In other embodiments, the system requests information from wearable devices that may be able to measure other variables such as heart rate, skin temperature, movement detection, etc. The wearable devices may be queried for such data, and the data can be used to make determinations about the environmental conditions.

In some embodiments, the environmental conditions are then controlled based on a combination of input from occupants and data from the sensor.

Building Analysis

Figure 9A:
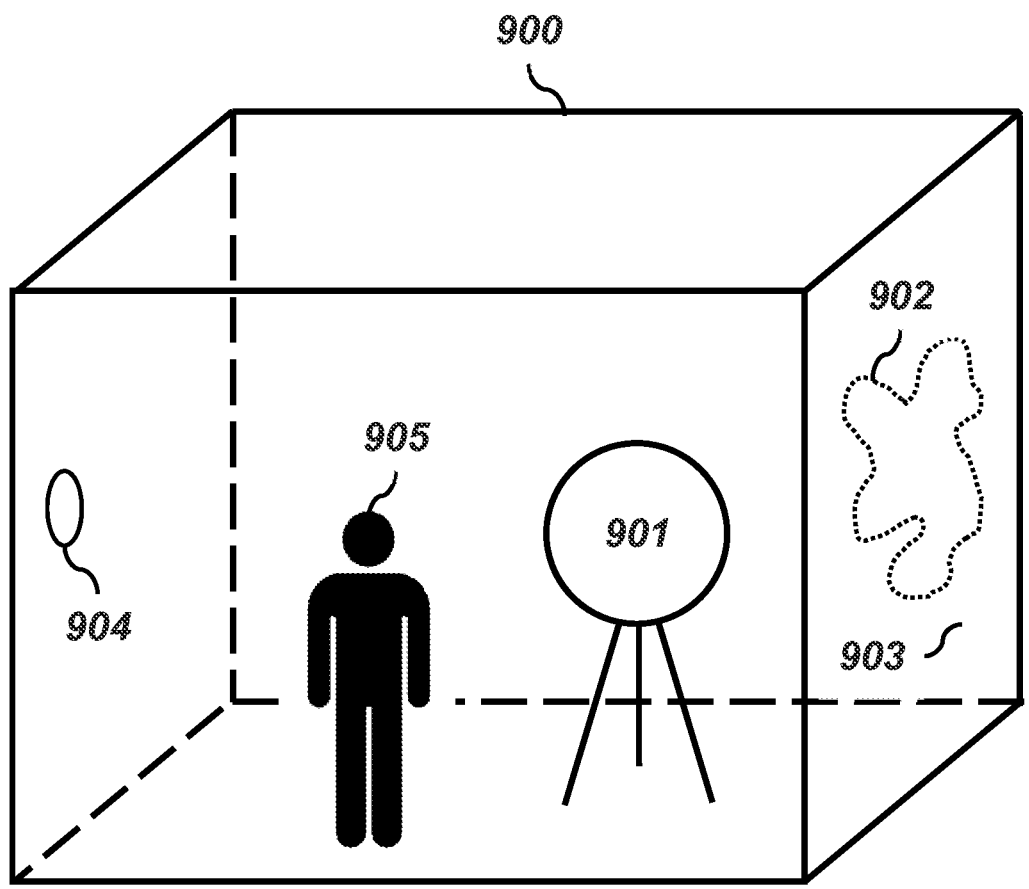
FIG. 9A is a diagram of a system for use in building analysis.

FIG. 9A illustrates an embodiment used for the analysis of buildings. Such analyses include, but are not limited to, the thermal and energy performance of spaces. For example, finding areas with a lack of insulation. Referring to FIG. 9, in one embodiment of such a space (900), the sensor (901) measures the surfaces of a room, and compares to surrounding locations, and if, e.g., one area (902) of a wall does not have statistically similar temperature characteristics to another area (903) of the same wall, an insulation or other performance issue is noted. The sensor may be permanently or temporarily installed for these analyses. Further, the sensor can be programmed to take these analyses into account, and adjust the setpoint of, e.g., a conventional thermostat (904) via, e.g., Bluetooth, WiFi, ethernet, or some other wired or wireless communication technique in order to make occupants (905) more comfortable and reduce energy consumption. In some embodiments, the system receives input from the occupants (905) from, e.g., a smart device such as a smartphone, smartwatch, etc.

Figure 9B:
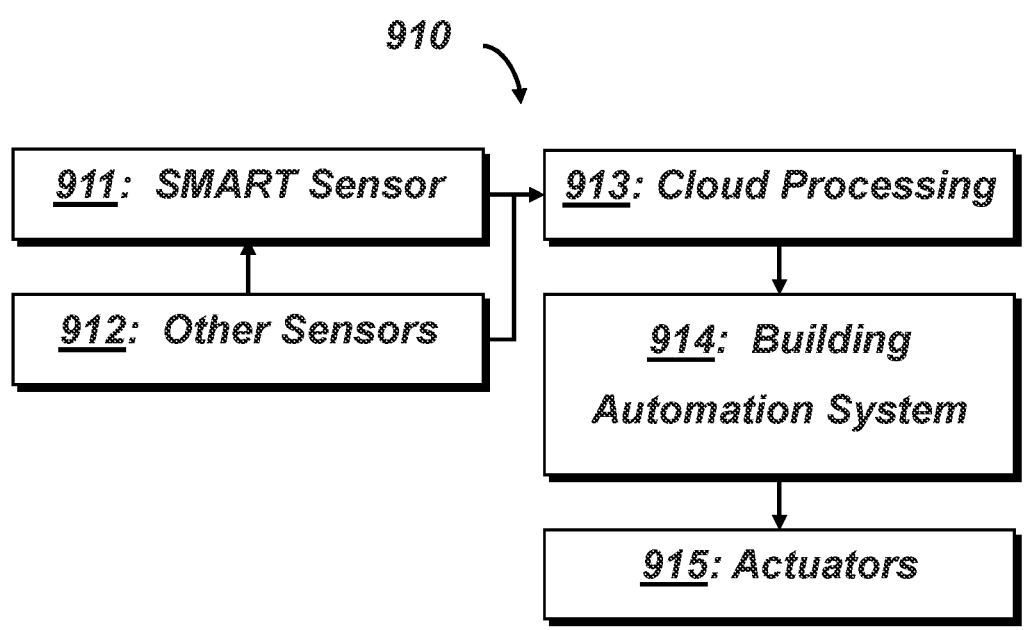
FIG. 9B is a flowchart of a system configured to control actuators in a building.

FIG. 9B illustrates a simple example flowchart (910) for controlling devices in a space, such as an actuator. In some embodiments, using data from the non-contacting temperature sensor (911), and optionally other sensors (912), the data may be sent to a remote server (e.g., cloud) (913) for processing, or may be sent directly to a building automation system (914), including, e.g., a thermostat. The building automation system (914) then directs the actuator (915) (e.g., turns on a radiator or fan) as appropriate. In other embodiments, the sensor (911) system may control an actuator (915) directly. In one embodiment, the sensor system is configured to control building systems other than HVAC, and directly controls, for example, lighting, security locks, and garage doors at a residential location.

The system need not inform or control other systems with mean radiant temperature (MRT) data but may use other data. For example, number of occupants, human thermal load or custom metrics such as Average MRT throughout a space may be appropriate in some situations. In addition, the surface temperatures of active or passive thermal mass in the building can be used to control the storage of heating or cooling to enable load shifting and flexibility of when the electrical heating and cooling systems create demand to improve generation stability. In one example, in non-building situations, such as on a plane, the Average MRT throughout the plane may be more appropriate than MRT data at multiple locations. Other non-building control situations—on boats, in cars, for medical uses, etc., may have other metrics or needs that are appropriate.

The system may also be configured to calculate metrics that involve radiative heat transfer (such as operative temperature) and using this information to determine and verify setpoints for HVAC systems. In some embodiments, this process involves a combination of input from occupants (see, e.g., ref 905 in FIG. 9A) and data from the sensor to control environmental conditions. In some embodiments, the solicitation of input from occupants is based on data from the sensor. For example, the system may detect the temperature may be cold for a user and may ask the user to confirm whether they are comfortable. Some embodiments also include systems that are configured to allow the adjustment or weighting or readings and/or factors to account for clothing, emissivity of surfaces or transmissivity of objects, where such weighting can occur after a scan is complete or on-the-fly. Still other systems may be configured to make a determination of thermal comfort beyond just MRT data.

Still other systems may be configured to calibrate energy models for heat loss and insulation levels and thermal storage in passive and activated thermal mass in building simulation and analysis. That is, the sensors may be used as input for software modeling and analyzing a building or building design.

In still other embodiments, the system may be configured to quantify and/or confirm energy savings and operational performance of buildings. In one embodiment, a series of baseline scan scans is performed (for example, capturing data for a given space over an appropriate period of time, such as a week or month) of a particular space. Following work done to improve the performance of the space (for example, by replacing old windows with newer windows), the system can then perform another scan or series of scans of that particular space, and by comparing, e.g., the MRT of various locations within the space, the savings and performance of the building can be quantified and/or confirmed.

Figure 10A:
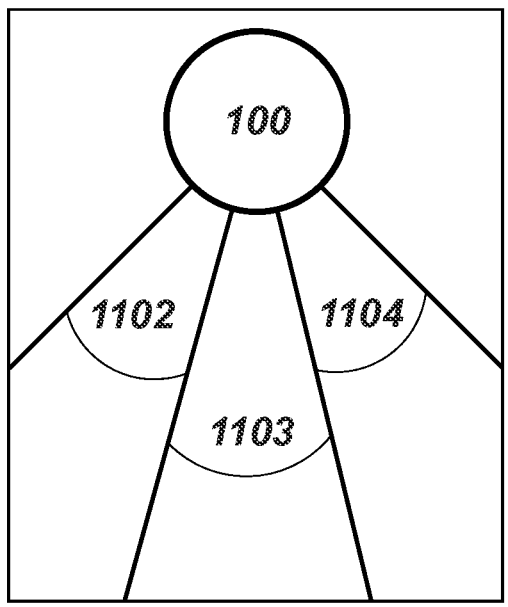
FIGS. 10A and 10B are diagrams of systems with fixed (10A) and variable (10B) scan densities.
Figure 10B:
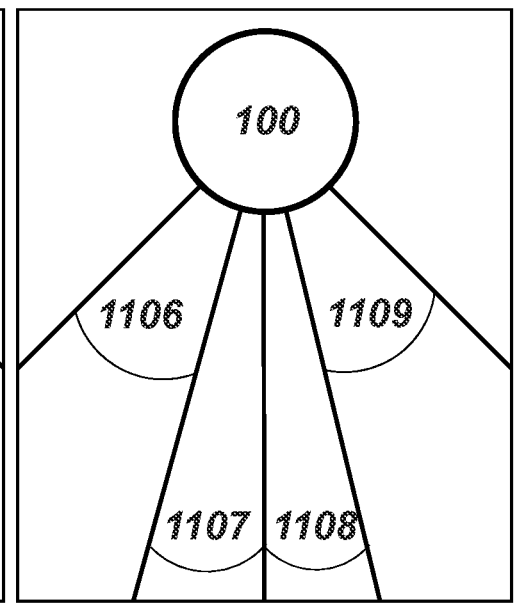

As illustrated in FIGS. 10A and 10B, with any of the disclosed system for any application, the sensor may have a fixed (FIG. 10A) and/or a variable (FIG. 10B) scan density. Variable scan densities allow the system to utilize oversampling of points and use any distribution of points to meet a particular desired functionality. Referring to FIG. 10A, in some embodiments, the system may be configured to rotate the sensor (1101) a fixed number of degrees (1102, 1103, 1104) before taking another reading, or it may be configured to rotate at a fixed speed. Referring to FIG. 10B, in other embodiments, the system may vary the number of degrees (1106/1109 vs. 1107/1108), or vary the rotation speed, between readings. Depending on the specific needs of the system, the system can be configured such that the scan pattern can change during the scan rather than using a predetermined one. For example, in some embodiments the system can use distance information to oversample far away surfaces and generate a constant scan density across surfaces. In other embodiments, the sensor may also oversample areas of interest such as potential people when doing occupancy detection.

It should be noted that the SMART sensor can integrate data sources such as external air temperature sensor or weather forecast data. This means that the sensor may have access to internal air temperature, internal surface temperatures and external air temperature and/or weather. If the building is at steady state, the system can calculate the r value of the wall to compare against specifications (BIM model, plans, building codes, etc.) or nearby areas to find degraded and/or poor insulation.

Imaging/Mapping/Modeling

The system can further be configured to include the meshing of point clouds to model and find surfaces and objects in a given volume of space. A point cloud can be analyzed and tuned to find flat surfaces and/or orthogonal edges that improve the matching to expected building geometry. Statistical methods can find the most likely surfaces and those can be informed by observed geometries of the space form direct inspection or from digital models. Further, the sensor system can be used to generate 3D and 2D models and/or representations of spaces and buildings using data from the sensor, such as a floorplan with thermal information or a 3D model of a building. Alternatively, the system can be used to generate 2D images of surfaces, scenes and environments—especially when combined with utilizing variable scan densities. Additionally, the system can also be configured to use the sensor to generate 3D point clouds of surfaces, scenes and environments. In other embodiments, the system is configured for the calibration of energy models for heat loss and insulation levels in building simulation and analysis, or for the commissioning of building systems, particularly new radiant systems, to ensure appropriate comfort via measurement of predicted/expected/needed MRT. This may also include quantifying and confirming energy savings and operational performance of buildings.

The sensor may also be cross-referenced with external data sources such as architects plans, BIM models, etc., in order to link the thermal impact of building HVAC systems to the actual systems.

Further, multiple scans collected while moving a sensor around (or multiple individual sensors) can be stitched together to provide larger coverage and model heat transfer between rooms.

Commercial/Industrial/Manufacturing Locations

The system may also be used in a manufacturing environment. For example, the system may be used for parts detection—detecting a part or component as it passes under the sensor. It may also be configured for use in quality control checks, such as when testing PCB boards for short circuits, and detecting faults found in overheating elements. It may also be used to track parts moving around the manufacturing floor and detecting faults or problems with product flow integrating with computer vision systems. In many of these situations, the system may also be configured to inform or control aspects of the manufacturing process—for example, if the system detects that parts are failing to transfer from one conveyor belt to another, the system may sound an alarm, alert an operator, and/or shut down the production line.

Further, the system may be configured as a safety device in a commercial, industrial, or manufacturing environment. For example, to prevent operators from entering a restricted or potentially dangerous area, an administrator can define what areas an operator should not enter while the machine is on. The sensor can detect both occupant location and proximity to excessive temperatures or chemical risk. When the system detects a human being entering that area, the system can be configured to power down the area, sound an alarm, alert the admin, or otherwise take steps to prevent injury to the individual that has entered a restricted area.

The sensor can also "see" through typical packing materials such as polyethylene that are transparent in the long wave IR spectrum. In this manner, parts may be detected and/or tracked through visibly opaque materials. This also allows for fault detection that wouldn't otherwise be visible.

From a fault detection perspective, the sensor can figure out which machine is malfunctioning automatically by using its location. For example, in a machine shop, it could automatically shut down a single lathe rather than impacting the entire production line, as the sensor can determine a particular location within the room that a fault is occurring.

As one example of a system, the SMART sensor can use a Thermal-Geometric Sensor Efficacy (TGSE) framework. TGSE is defined as the number of kilowatt hours below the modeled ASHRAE 55.1 ventilation standard that a thermal-geometric system achieves.

$$TGSE = \sum_{1}^{n}(M_c \cdot M_p),$$

where n is the number of control zones in a given installation, $M_c$ is the confusion matrix (represented as a column vector) between the ground truth and the reported results from the sensor and $M_p$ is a penalty vector of weights: $\{\alpha, \beta, \gamma, \epsilon\}$, where $\alpha=0$, true positive, $\beta=+1$, false positive, $\gamma=-1$, false negative, and $\epsilon=0$, true negative.

For a given installation at a given time, the TGSE has a fundamental limit of: $P_{base}+N_{occupant}*P_{per\ occupant}$, where $P_{base}$ is the energy consumption for HVAC in an unoccupied building and $P_{per\ occupant}$ is the energy required to adjust the building systems for that occupant. Determining this value is nontrivial and there are a multitude of statistical, environmental, and circumstantial factors that contribute to the error in the $N_{occupant}$ returned by the sensor. Understanding these factors is intricately related to the sensor design and its deployment scenarios.

The values for the penalty vector will be informed by the simulation and experimental results described in the following section. True positives and negatives contribute no deviation from the optimal energy expenditure for a given occupancy status, false positives expend more energy than is necessary (positive values), and false negatives decrease occupant discomfort and air quality (negative values). Comparisons will be made with ground truth which will independently verify the lower bound of TGSE. Any value below this bound will contribute to the false negative error rate.

The contributing factor to energy efficiency is $P_{per\ occupant}$ which is a function of the control actions taken by the buildings systems and the types of systems available in the building. A key term in this function that is unique to thermal-geometric sensing generally, and the SMART sensor specifically, is that the method senses thermal conditions to control thermal actuators. This allows the system to adjust the comfort level of occupants directly, as opposed to relying on calculated averages and proxies, which currently cause endemic occupant discomfort, in addition to wasting energy, a result of narrow empirical comfort definitions. The inclusion of geometric data allows the production of a mean radiant temperature (MRT) model of an entire space.

Collecting MRT models offers numerous benefits with regard to adaptive building algorithms like ACQUA. These algorithms can be used to learn the physics of the building, in which it is installed, through the use of regression analyses of thermal-geometric qualities rather than just the point temperatures reported by discrete sensor deployments. These algorithms reduce the severity of the thermal gradient by permitting slower gradual changes and predicting the demand on distributed local thermal amenities. Creating accurate predictive models of a building's thermal characteristics will result in more effective comfort adjustments over the lifetime of the installation. These algorithms are aware of building physics and transient properties of occupants, improving energy efficiency.

There are also advantages offered by combining field data with the material data that is present in building information models which are standard practice for AEC (Architecture, Engineering, Construction) groups. This opens opportunities for synergistic information exchange between building design, building management, and building physics groups.

The spatial geometries of the spaces in which a sensor can be installed can introduce several failure modalities. The most serious of these is object occlusion. Programmatically, this modality can be avoided through, e.g., the inclusion of both a boolean difference logic between the baseline geometry and the geometry at scan time t and a time series analysis. This hybrid spatiotemporal metric allows the system to avoid situations where an occupant is physically occluded, behind a column or wall, for example, as well as when they are thermally occluded but physically visible, potentially by furniture or their own clothing/hair. The boolean difference here is not simply motion detection by comparing subsequent frames. It uses an understanding of the geometry of an empty room to determine the presence of people.

From the viewpoint of two sensors in opposite corners of a crowded room, there is some volume that will be seen by both sensors, some that is only seen by one or the other, and some that is seen by neither. If an area/volume of space is not seen by a given sensor, that area would otherwise be occluded and result in a high false negative rate for that sensor, if it were to be deployed alone. By using two or more sensors, or one sensor that can be positioned in at least two different points in space, potential false negatives can be reduced to, e.g., those cases where someone in the office is missed in time by both sensors and is hidden beneath a desk.

Since in this example, one stringent metric was a $0.9 \cdot N_{occupant}$ requirement to preserve thermal comfort and indoor air quality (IAQ), minimizing this failure rate was critical. One of the ways to avoid this is through targeted sensor installation that minimizes the probability of these occlusion events. A miniaturized, wall/ceiling mounted version that can be installed discretely can be useful in those situations.

Humans emit radiation in a unique temperature range despite variations caused by clothing. These variations result in surface temperatures below body temperature. However, they are still significantly higher than background surfaces. Similarly, the vast majority of hot objects in commercial spaces (computers, radiators, machinery) have much higher surface temperatures than humans.

Given the low resolution of IR spectrum sensors (relative to visible spectrum imaging), detecting a person can be challenging. In this example, oversampling areas of interest may be used to generate a high-resolution subsection of the scan. This helps to further define the shape and size of the object of interest. In a cascade of features, this may be addressed through a feedback loop between shape, distance, and size of features of the 3D geometry and its combination with temperature data specific to occupants. Additional data from other sensors such as $CO_2$ concentrations could be utilized as the basis of subsequent classifiers in the future.

In this example, the SMART sensor system begins by identifying all possible areas representing a person before using a series of checks using its hybrid thermal-geometric data to move towards the ground truth and reduce the variance (see FIG. 16). The first analysis uses temperature data to identify all points within an appropriate temperature band. The mean is very high due to the large number of false positives and the variance is also high. We begin by analyzing the shape of the object to eliminate some of the false positives. This reduces both the mean and the variance. The distance data may be used to calculate the size of the object; further reducing the mean and variance. This brings the prediction closer to the ground truth, however, it causes a risk of false negatives which could compromise occupant comfort. Consequently, information about the 3D geometry of the room (either collected using the LiDAR or from CAD/BIM models) can be used to calculate occlusion and find any false negatives that may have been incurred in the previous steps. This prevents false negatives that could undermine occupant comfort and slightly increases both the mean and variance. These increases are accounted for by introducing multiple scans done over time within each, e.g., 30-minute period. During each period, the example system completes, e.g., at least 30 full 360 degree scans.

The reliance on radiative properties of human skin in addition to geometric features of human bodies helps to eliminate bias present in visible spectrum data and ensures excellent performance in a diverse range of scenarios. All humans emit IR radiation in the same general range and share a baseline of geometric features whose availability is only modified by the occlusion problems mentioned above.

Thus, the unique fusion of data from the SMART sensor helps to eliminate false negatives caused by occupant diversity and scenario variation by combining thermal, morphological, geometric and temporal information into a single predictive model.

In this example, simulation tools were used to optimize the SMART sensor system installation by minimizing the number of sensors required and maximizing the quality of the data. Further, the focus on thermal radiation and space geometries avoids complex fluid-dynamics problems associated with $CO_2$ or other air-sensing techniques which can have feedback effects that arise from a system increasing or decreasing ventilation rate of the space that is being sensed. Complex and computationally expensive signal processing techniques that would be necessary in an auditory-based system are also avoided. Significant variation can be introduced to these systems by room function (a lecture hall versus a library, for instance), room adjacencies (an office next to a busy road), and occupant behavior (kindergartens versus funeral homes). In our system, if an occupant is thermally and/or geometrically present and/or has been present within the last scanning cycle and/or is different from the baseline geometry, we will be able to reliably count and locate them spatially. Ultimately, the SMART sensor system detects people rather than relying on proxies with weak signals and large amounts of noise. This approach is inherently more robust and flexible than the alternatives as it has access to 4 independent data outputs (temperature, shape/size/distance, comparison with base geometry, temporal variation) that can be statistically regressed using multivariate techniques to achieve the highest probability of true positive detection, exceeding 0.998.

In this example, hybrid geometric and agent-based simulations can be developed, which can be used to produce synthetic datasets with which we can train supervised machine learning models. Simulations can be used to create a statistically significant number of situations that demonstrate otherwise obscure failure modes, such as thermal reflections, humanoid figures that are out of the known temperature range (mannequins, for instance), etc. The datasets may then be used, in combination with convolutional neural nets, regressions, and other statistical techniques (See Technical Approach) to determine weighting factors that avoid the energy efficiency losses incurred by false positives.

In this example, simulations may also be conducted using real Building Information Models (BIMs) to determine the number of required SMART sensor to provide adequate coverage in a space and the most efficient locations for them. Synthetic data can be generated from scenarios that may not otherwise be readily available, i.e. spatial data from hotels, convention centers or other building types, to test SMART sensor in that environment. Moreover, performance metrics can be determined or estimated for an exact building, helping to drive user adoption by providing tangible performance benefits for facilities managers and building owners. Building Information Models are extensively used in modern commercial buildings, and information from these simulations may be used to influence the design of future buildings.

In the example method, ground truth was established through pairing field-deployed sensor data with concurrent video feeds that are annotated via a low-cost human data mining technique, although other methods are envisioned. For some of these deployments, existing building systems can provide reliable Boolean occupancy values (motion-activated lights) that can be augmented with the above analog methods. Lighting, as a metric, is more reliable than the motion detectors that control them because occupants will tend to manually ensure that the lights are switched on even if they are not initially detected by the motion sensors. For our controlled lab environments, the quasi real-world setups can be built with turnstiles at entrances and exits that will provide a highly accurate running total of occupants.

A 3D baseline can be taken at installation time that produces a geometric baseline from which deviations contribute to the 3D Geometry in the cascade of features. This baseline will be updated over time as furniture and other objects in the room move. This baseline may also be generated from floorplans and 3D models of rooms. All commercial buildings maintain either architectural drawings or building information models that could be effortlessly integrated into the SMART sensor system's geometric information.

The data produced by a thermal-geometric approach takes the form of a 5-dimensional array: 3 spatial dimensions, 1 for temperature, 1 for time series. Our preliminary results suggest that this can be analyzed through a temporal convolutional neural network. This strategy has a much lower memory requirement than a real-time recurrent neural net analysis. Because of physical limits of the building systems in the example (30 min scanning interval), the time-delay incurred by buffering scans into a batch dimension is irrelevant. Further, although there are some memory and processing limitations with low-cost embedded hardware, a machine learning (ML) technique like parameter sharing can overcome this issue. Additionally, there are an increasing number of promising low-cost, dedicated ML hardware offerings being developed for internet of things (IoT) and sensing applications.

The use of, e.g., laser and IR measurements eliminate untenable computational fluid dynamics (CFD) simulation or laser interferometric measurement and analysis associated with air sensing techniques. For any simulation and modeling, it is possible to rely on more robust geometric ray tracing applicable to Building Information Models or traditional geometric models. Based on the Helmholtz Reciprocity of electromagnetic radiation, these ray tracings can provide accurate information earlier that can then be experimentally-informed to optimize sensor location and data processing. Combining these analyses with our constructed controlled laboratory environments will allow a data assimilation loop to be set up, for improving, e.g., testing and validation models.

In this example, these simulation and data processing routines are in service of the sensor's contribution to energy savings and optimized occupant comfort. The optimization and actuation strategies for energy savings can be based on, e.g., the following approaches: (i) Accurate occupancy-based control of cooling/heating, ventilation, lights, and blinds; (ii) Optimization using predictive models: e.g. for weather and occupancy forecasts; (iii) Benchmarking and using the most effective actuators to achieving the desired building condition; for example, adjusting either the lights or the blinds to control illumination (or mean radiant temperature); (iv) Accounting for real-time pricing and modern grid operations; (v) Effectively communicating energy usage and environmental impact information to occupants and building operators; and (vi) Using a multiplicity of sensors and data-types.

In one example, these strategies have been integrated into a collaborated energy management and control (cEMC) system. The cEMC system was tested and validated in an office building and demonstrated overall 40% target energy savings comparing to the state-of-the-art building energy management approaches.

The presence, the count, the location and the thermal comfort of occupants in a building structure can be accurately determined by the SMART Sensor, and the rest part of the cEMC system can be enabled with reasonable engineering efforts.

In one example, multiple "micro-zones" in a single space (e.g. open office or classroom) can be controlled and managed individually using multiple actuators for ventilation, heating, cooling, lighting and shading for different micro-zones. In another example, one or multiple SMART Sensors are mounted on the ceiling, and communicate with a Room Automation System via standard, open-source, automation protocols/interfaces. The system used a dedicated computing node—an Optimizer/Overrider—to carry out cEMC optimization based on SMART Sensor data and override existing control setpoints.

In another example, a cEMC based BAS that utilizes the SMART Sensor data and carries out control and optimization over the entire building is an essential component to achieve a particular overarching energy saving goal. The cEMC based Control Center includes the Building Level Refined Model and Optimizer, which is dedicated to the optimization of energy efficiency in the entire building. Additionally, a Hardware-In-the-Loop Simulation module is included. The simulation module will complement the real-world building and extend the energy saving tests to various other scenarios, where the physical building may not be available.

Those in the art will understand that a number of variations may be made in the disclosed embodiments, all without departing from the scope of the invention, which is defined solely by the appended claims

What is claimed is:

1. A mean radiant temperature sensor device system, comprising:
    a two or more degree-of-freedom motion system comprising a first motor or servo configured to rotate a first component around a first axis and a second motor or servo configured to rotate a second component around a second axis orthogonal to the first axis;
    a non-contacting temperature sensor operably connected to the two or more degree-of-freedom motion system;
    data storage; and
    a processor configured to control the two degree-of-freedom motion system and receive data from the sensor,
    wherein the data storage contains instructions that, when executed by the processor, allows the mean radiant temperature sensor device system to calculate mean radiant temperature (MRT), and perform at least one function selected from the group consisting of:
        occupancy detection, counting objects or individuals, locating objects or individuals in a volume of space, tracking an object or individual over time and space, detection of unsafe environmental conditions, characterization of unsafe environmental conditions, tracking of unsafe environmental conditions, detection of gases, detection of liquids, characterization of gases, characterization of liquids, tracking of gases, tracking of liquids, analysis of buildings, determination of control metrics for a building or volume of space, generation of 3D and 2D models or representations of spaces and buildings using data from the sensor, generating 2D images of surfaces, generating 2D images of scenes, generating 2D images of environments, generating 3D point clouds of surfaces, generating 3D point clouds of scenes, generating 3D point clouds of environments, controlling actuators, controlling HVAC systems with data other than mean radiant temperature (MRT), informing HVAC systems with data other than MRT, controlling building systems other than HVAC, estimating a metabolic rate using surface temperature information from the sensor, estimating the thermal capacitance of living organisms, receiving input from occupants, requesting input from occupants based on data from the sensor, controlling the environmental conditions based on a combination of input from occupants and data from the sensor, calibrating energy models for heat loss and insulation levels in building simulation and analysis, commissioning building systems to ensure appropriate comfort via measurement of MRT, and quantifying and confirming energy savings and operational performance of buildings.

2. The system according to claim 1, wherein the processor is configured to (i) calculate a mean radiant temperature (MRT) using a view factor and radiative heat exchange calculation, (ii) determine the effects of the radiative environment on a real or hypothetical person, animal or object, (iii) use meshing of point clouds to model and find surfaces and objects, or (iv) a combination thereof.

3. The system according to claim 1, wherein the system is configured (i) for use in a non-building application, (ii) to oversample points, or (iii) to use any distribution of points, or (iv) a combination thereof.

4. The system according to claim 1, wherein the processor is (i) configured to calculate occlusion based on data from the sensor, (ii) configured to determine thermal comfort, (iii) configured to receive data from a source other than the non-contacting, temperature sensor, (iv) adapted to integrate building information models (BIM) with the data from the sensor, (v) configured to perform a calculation prior to the completion of a scan, (vi) configured to adjust or weight a reading or factor to account for at least one variable selected from the group consisting of clothing, emissivity of surfaces, and transmissivity of objects, or (vii) a combination thereof.

5. The system according to claim 1, wherein the non-contacting temperature sensor is (i) configured to use a variable scan pattern, (ii) configured to perform an action based on the received data from the source other than the non-contacting, temperature sensor, (iii) configured to collect data continuously during continuous movement of the two or more degree-of-freedom motion system, (iv) capable of functioning as a structured light sensor, or (v) a combination thereof.

6. The system according to claim 1, wherein the non-contacting temperature sensor is one of a plurality of non-contacting temperature sensors.

7. The system according to claim 6, wherein the plurality of non-contacting temperature sensors is an array of sensors.

8. The system according to claim 1, wherein the system further comprises a lens or beam splitter.

9. The system according to claim 1, wherein the system further comprises galvanometers configured to control movement of the axes.

10. The system according to claim 1, wherein the field of view of the sensor is adjustable.

11. The system according to claim 1, further comprising a filter selected to alter the sensitivity of sensors to a plurality of wavelength of light.

12. The system according to claim 1, wherein the non-contacting temperature sensor is configured to move relative to a fixed geographic position.

13. The system according to claim 12, wherein the sensor is mounted on an object selected from the group consisting of a drone, vehicle, and robotic arm.

14. The system according to claim 1, wherein the two or more degree-of-freedom motion system provides at least three degrees of freedom.

15. The system according to claim 1, wherein the processor is configured to communicate with at least one component selected from the group consisting of a visual camera, an air quality sensor, a gas detection sensor, a radiation sensor utilizing at least one wavelength different from the non-contacting temperature sensor, a time of flight camera, and a structured light sensor.

* * * * *